(12) United States Patent
Sueyoshi et al.

(10) Patent No.: US 7,478,435 B2
(45) Date of Patent: Jan. 13, 2009

(54) VERSION MANAGEMENT SYSTEM FOR MULTIPLE APPLICATION ELEMENTS

(75) Inventors: Masahiro Sueyoshi, Kanagawa (JP); Fumio Kubono, Tokyo (JP); Kei Tateno, Tokyo (JP)

(73) Assignee: Sony Corporation, Tokyo (JP)

( * ) Notice: Subject to any disclaimer, the term of this patent is extended or adjusted under 35 U.S.C. 154(b) by 770 days.

(21) Appl. No.: 10/282,109

(22) Filed: Oct. 29, 2002

(65) Prior Publication Data
US 2003/0167398 A1 Sep. 4, 2003

(30) Foreign Application Priority Data
Oct. 30, 2001 (JP) ............................. 2001-333468

(51) Int. Cl.
*G06F 7/04* (2006.01)
*G06F 17/30* (2006.01)
(52) U.S. Cl. ..................................... 726/27
(58) Field of Classification Search ............... 380/280, 380/286; 726/18, 27
See application file for complete search history.

(56) References Cited

U.S. PATENT DOCUMENTS

| | | | |
|---|---|---|---|
| 5,278,979 A * | 1/1994 | Foster et al. ............... 707/203 |
| 5,857,022 A * | 1/1999 | Sudia ......................... 713/173 |
| 6,249,869 B1 | 6/2001 | Drupsteen et al. | |
| 6,308,317 B1 * | 10/2001 | Wilkinson et al. .......... 717/139 |
| 6,370,573 B1 * | 4/2002 | Bowman-Amuah ......... 709/223 |
| 6,381,698 B1 * | 4/2002 | Devanbu et al. ............. 713/170 |
| 6,584,476 B1 * | 6/2003 | Chatterjee et al. ........... 707/203 |
| 6,757,893 B1 * | 6/2004 | Haikin ....................... 717/170 |
| 6,892,301 B1 * | 5/2005 | Hansmann et al. .......... 713/172 |
| 7,050,589 B2 * | 5/2006 | Kwan ......................... 380/286 |
| 7,058,819 B2 * | 6/2006 | Okaue ........................ 713/193 |
| 7,127,612 B1 * | 10/2006 | Ishibashi .................... 713/169 |
| 2002/0108036 A1 * | 8/2002 | Okaue ........................ 713/168 |

FOREIGN PATENT DOCUMENTS

| WO | WO 99/15989 | 4/1999 |
|---|---|---|
| WO | WO 00/43878 | 7/2000 |

* cited by examiner

*Primary Examiner*—William S Powers
(74) *Attorney, Agent, or Firm*—Oblon, Spivak, McClelland, Maier & Neustadt, P.C.

(57) ABSTRACT

An application program comprises a plurality of 1st application elements each having a plurality of versions. In this case, the versions are managed by using version management data each used for managing relations between a plurality of 2nd application elements each corresponding to one of the versions and the 1st application elements, and by using management data for managing relations between the 1st application elements and the version management data. As a result, it is possible to provide a data-processing apparatus capable of properly restricting users setting application programs in a server for security reasons.

19 Claims, 33 Drawing Sheets

1

SOFTWARE CONFIGURATION OF SAM

FIG. 7

| AP RESOURCE ELEMENT TYPE NUMBER | AP RESOURCE ELEMENT TYPE |
|---|---|
| 0x0001 | AP RESOURCE KEY |
| 0x0002 | IC CARD SYSTEM KEY |
| 0x0003 | IC CARD DIVISION KEY |
| 0x0004 | IC CARD AREA KEY |
| 0x0005 | IC CARD SERVICE KEY |
| 0x0006 | IC CARD DEGENERATION KEY |
| 0x0007 | KEY REFERRED TO BY MACRO SCRIPT |
| 0x0008 | FILE CONFIGURATION DATA (EXAMPLE: LOG·NEGATIVE·JOURNAL) |
| 0x0009 | JOURNAL FILE FOR RECORDING IN THE EVENT OF A FAILURE |
| 0x000A | FILE FOR FILE SYSTEM SIGNATURE KEYS |
| 0x000B | MUTUAL AUTHENTICATION KEY FOR SAM Mgr |
| 0x000C | RELATED TO KEY FOR MUTUAL AUTHENTICATION BETWEEN SAMS (ALSO AUTHENTICATION BETWEEN APS IN SAME SAM) |
| 0x000D | INTER-SAM KEY PACKAGE KEY |
| 0x000E | MACRO SCRIPT |
| 0x000F | MANUFACTURING KEY PACKAGE |
| 0x0010 | EXTENDED-ISSUANCE KEY PACKAGE |
| 0x0011 | ISSUANCE KEY PACKAGE |
| 0x0012 | MEMORY DIVISION KEY PACKAGE |
| 0x0013 | MEMORY DIVISION KEY ELEMENT PACKAGE |
| 0x0014 | AREA RECORDING KEY PACKAGE |
| 0x0015 | AREA DELETION KEY PACKAGE |
| 0x0016 | SERVICE RECORDING KEY PACKAGE (INTERNALLY GENERATED) |
| 0x0017 | SERVICE DELETION KEY PACKAGE (INTERNALLY GENERATED) |
| 0x0018 | KEY CHANGE PACKAGE (INTERNALLY GENERATED) |
| 0xff00 | MANUFACTURE KEY |

Rows 0x0002 through 0x0006 are bracketed as CARD ACCESS KEYS.

F I G. 8

| ELEMENT TYPE | APE_VER (APE VERSION) |
|---|---|
| IC CARD SYSTEM KEY, IC CARD AREA KEY AND IC CARD SERVICE KEY | VARIOUS KEY VERSIONS ARE USED |
| IC CARD DIVISION KEY | N/A |
| IC CARD DEGENERATION KEY | ORIGINAL MANAGEMENT: NO CONCEPT OF KEY VERSION IN THE FIRST PLACE |
| MANUFACTURING KEY PACKAGE | VERSION OF SYSTEM KEY |
| ISSUANCE KEY PACKAGE | VERSION OF 0000-AREA KEY |
| EXTENDED-ISSUANCE KEY PACKAGE | VERSION OF SYSTEM KEY |
| DIVISION ORIGIN PACKAGE | VERSION OF SYSTEM KEY USED AS DIVISION OBJECT (PARENT SIDE) |
| DIVISION PACKAGE | VERSION OF SYSTEM KEY USED AS DIVISION OBJECT (PARENT SIDE) |
| AREA RECORDING KEY PACKAGE | VERSIONS OF AREA KEYS |
| AREA DELETION KEY PACKAGE | VERSIONS OF AREA KEYS |
| SERVICE RECORDING KEY PACKAGE | VERSIONS OF SERVICE KEYS |
| SERVICE DELETION KEY PACKAGE | VERSIONS OF SERVICE KEYS |
| KEY CHANGE PACKAGE | POST-CHANGE NEW KEY VERSION |

FIG. 15

| APE_N | APE_ID | | IEI | PARTNER SAM_ID | PARTNER AP_ID | K_CARDA | K_SAM | SET_APP |
|---|---|---|---|---|---|---|---|---|
| | APE_TYPE | APE_INS_NUM | | | | | | |
| SERVICE A | IC ACCESS KEY | 1008 | INTERNAL | ITS OWN SAM_ID | N/A | XX1,...,XXn | N/A | N/A |
| SERVICE C | IC ACCESS KEY | 101C | INTERNAL | 43.17.19.19 | 1 | YY1,...,YYn | TT1,...,TTn | 310_1 |
| SERVICE B | IC ACCESS KEY | 100C | EXTERNAL | 43.13.137.1 | 2 | OBTAIN KEYS FROM SAM GROUP AND HOLD HOLDABLE KEYS | SS1,...,SSn | 310 OF ANOTHER SAM |
| SERVICE B LOG | FILE SYSTEM CONFIGU-RATION | COLLECTION ID | EXTERNAL | 43.13.137.1 | 2 | OBTAIN KEYS FROM SAM GROUP AND HOLD HOLDABLE KEYS | SS1,...,SSn | 310 OF ANOTHER SAM |

| APE_ID | READ | WRITE | EXECUTE |
|---|---|---|---|
| SERVICE B ACCESS KEY | 1 | 0 | 1 |
| SERVICE B LOG | 1 | 1 | 0 |
| SERVICE B LOG2 | 1 | 0 | 0 |
| AREA RECORDING KEY PACKAGE | 1 | 0 | 0 |
| AREA DELETION KEY PACKAGE | 1 | 0 | 0 |

| AP ELEMENT INSTANCE NUMBER | AP ELEMENT CONTENTS | AP_ID GENERAL-USER AP_ID | | | | AP_ID RESERVED | | | |
|---|---|---|---|---|---|---|---|---|---|
| | | 0x0000 | 0x0001 | --- | 0x000f | 0x0010 | --- | 0xfffd | 0xfffe | 0xffff |
| 0x0000 | GENERAL-USER ELEMENT | | | | | | | | | |
| 0x0001 | GENERAL-USER ELEMENT | | | | | | | | | |
| --- | --- | | | | | | | | | |
| 0x7F00 | GENERAL-USER ELEMENT | | | | | | | | | |
| 0x7F06 | RESERVED | | | | | | | | | |
| --- | --- | | | | | | | | | |
| 0xFFFF | RESERVED | | | | | | | | | |

Column groupings:
- 0x0000 – 0x000f: COMMON TO GENERAL USERS
- 0xfffd: FOR PRIVILEGED USERS
- 0xfffe: FOR PERSON IN CHARGE OF SHIPPING

| PLAYER | SET ITEM | AP_ID |
|---|---|---|
| PERSON IN CHARGE OF SHIPPING | GENERAL-USER AP RESOURCE KEY SHIPPING KEY | 0x0000~0x000F |
| | UNIQUE DEVICE NUMBER | 0xFFFF |
| PRIVILEGED USER | SAM ID | |
| | PRIVILEGED-USER AP AREA OPERATION KEY | 0xFFFE (PRIVILEGED-USER AREA) |
| | SAM ID NET MASK | |
| | NETWORK INFO SUCH AS SAM IP ADDRESS | 0xFFFD (AREA COMMON TO USER AREA) |
| GENERAL USER | GENERAL-USER AP RESOURCE KEY OPERATION KEY | |
| | OTHER AP RESOURCE ELEMENTS | 0x0000~0x000F (GENERAL-USER AREA) |

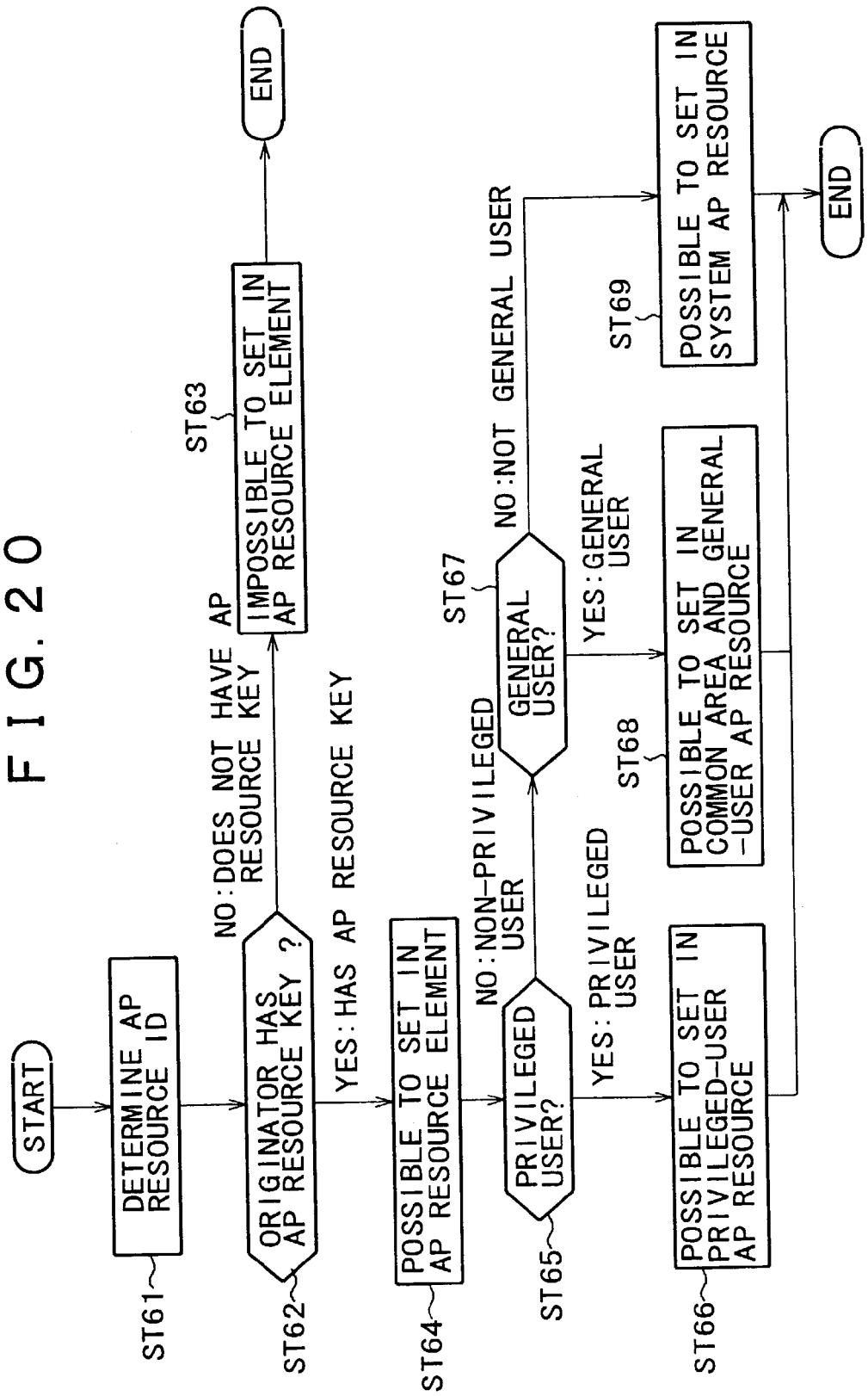

FIG. 23

| | |
|---|---|
| 80 | MANAGEMENT POINTER |
| 81 | ENTITY ID |
| 82 | ENTITY STATUS |
| 83 | IC CARD TYPE |
| 84 | SERVICE TYPE ELEMENT SPECIFICATION |
| 85 | PROCESSING ORDER |
| 86 | PRE-PROCESSING DATA (REQUESTED FEE APPENDED POINT COUNT) |
| 87 | POST-PROCESSING DATA (FINAL ACCEPTANCE OR DENIAL) |

IC CARD ENTITY

CARD ENTITY STATE TRANSITION DIAGRAM

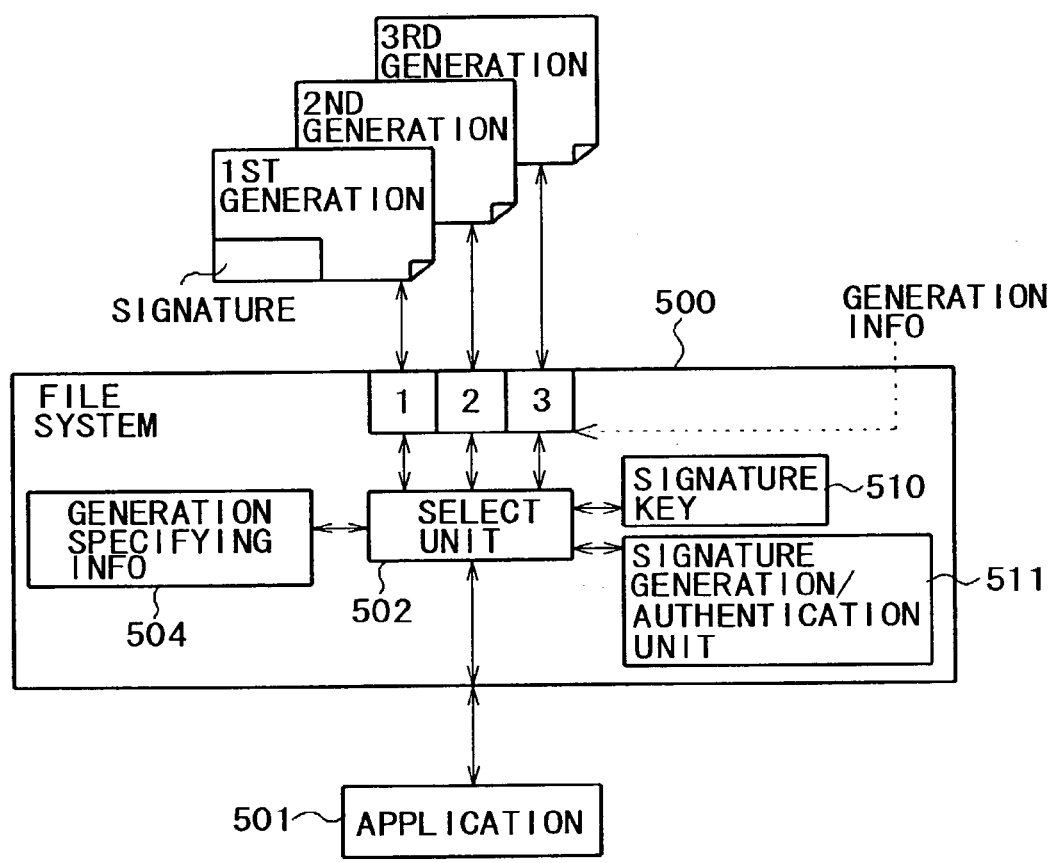
F I G. 3 1

VERSION MANAGEMENT SYSTEM FOR MULTIPLE APPLICATION ELEMENTS

BACKGROUND OF THE INVENTION

The present invention relates to a data-processing apparatus and a data-processing method, which are used for rendering services using integrated circuits (ICs), as well as relates to a program for implementing the data-processing method.

Nowadays, there has been developed a communication system for carrying out transactions through a network such as the Internet by using an IC card.

In such a communication system, at a request made by a service-rendering enterprise rendering a service using an IC card, a server executes an application program in order to carry out procedural processing prescribed by the service-rendering enterprise.

In accordance with a processing request received from typically an IC-card reader/writer or a PC (personal computer), the server carries out processing such as authentication of a user as well as encryption and decryption of data by execution of the application program.

There is a demand for protection of high-security data such as keys set by the service-rendering enterprise, accounting data and history data against illegal falsification and illegal monitoring. This is because the application program executed by the server processes the high-security data.

In addition, versions of some data comprising the application program are upgraded from time to time. It is thus necessary to provide a function for carrying out operations in a state of mixed data having upgraded and unupgraded versions after an operation carried out by the server to render a service is started.

Furthermore, from a security-assurance point of view, it is also necessary to control users carrying out setting operations for application programs of the server.

SUMMARY OF THE INVENTION

It is thus an object of the present invention addressing the problems encountered in the related art as described above to provide a data-processing apparatus capable of enhancing security of an application program executed by a server to render a service using an integrated circuit (IC), a data-processing method adopted by the data-processing apparatus and a program implementing the data-processing method.

It is another object of the present invention to provide a data-processing apparatus having a function to carry out operations in a state of mixed data having a plurality of versions, a data-processing method adopted by the data-processing apparatus and a program implementing the data-processing method.

It is a further object of the present invention to provide a data-processing apparatus capable of properly controlling users, who carry out setting operations for application programs of the server, for security-protection purposes, a data-processing method adopted by the data-processing apparatus and a program implementing the data-processing method.

In carrying out the invention and according to a first aspect thereof, there is provided a data-processing apparatus for executing an application program including a plurality of 1st data, exchanging data with a predetermined integrated circuit and providing a predetermined service in cooperation with the integrated circuit, wherein the data processing apparatus comprises:

a storage circuit for storing, when the 1st data has a plurality of versions:

a plurality of 2nd data each associated with one of the versions;

a version management data for managing a relation between the 1st data and the 2nd data; and management data for managing a relation between the 1st data and the version management data associated with the 1st data; and a processing circuit for performing, when carrying out processing on the 1st data, the processing by execution of:

referring to the management data to identify the version management data;

determining a particular 2nd data that is associated with a version specified by internal or external of said data-processing apparatus; and using the particular 2nd data in the processing.

Preferably, in the data-processing apparatus, the processing circuit determines one of the 2nd data that is associated with a version specified by version-specifying data included in the version management data, and carries out the processing by using the determined 2nd data.

Preferably, in the data-processing apparatus, the processing circuit determines one of the 2nd data that is associated with a version number obtained from a value specified internal or external to the data-processing apparatus as well as from a value specified by the version-specifying data, and carries out the processing by using the 2nd data.

Preferably, in a data-processing apparatus:

the version management data has a version identification data and said 2nd data that is associated with said version identification data in record format; and the processing circuit identifies the version management data by referring to the management data, searches the version management data by using a specified version identification data as a key for the 2nd data that is associated with the specified version identification data and carries out the processing by using the 2nd data.

Preferably, in a data-processing apparatus:

the version management data includes a table associating said version identification with the ID of one of the 2nd data that is associated with the version; and the data-processing circuit identifies the version management data by referring to the management data, searches the table of the version management data by using the ID of a specified version as a key for the ID of the 2nd data that is associated with the specified version and carries out processing to obtain the 2nd data by using the ID of the 2nd data as a base.

According to a second aspect of the invention, there is provided a data-processing method adopted by a data-processing apparatus for exchanging data with a predetermined integrated circuit in order to render a predetermined service in cooperation with the integrated circuit by execution of an application program comprising a plurality of 1st data, wherein the data-processing method comprising the steps of:

preparing, when the 1st data has a plurality of versions:

a plurality of 2nd data each associated with one of the versions;

a version management data for managing a relation between the 1st data and the 2nd data; and management data for managing a relation between the 1st data and the version management data associated with the 1st data;

causing, when carrying out processing on the 1st data, the data-processing apparatus to refer to the management data to identify the version management data;

causing the data-processing apparatus to use the identified version management data to determine a particular one of the 2nd data that is associated with one of the versions specified internal or external to the data-processing apparatus; and causing the data-processing apparatus to use the particular 2nd data.

According to a third aspect of the invention, there is provided a program adopted by a data-processing apparatus for exchanging data with a predetermined integrated circuit in order to render a predetermined service in cooperation with the integrated circuit by execution of an application program comprising a plurality of 1st data, wherein the program comprising the steps of:

preparing, when the 1st data has a plurality of versions:

a plurality of 2nd data each associated with one of the versions;

a version management data for managing a relation between the 1st data and the 2nd data; and management data for managing a relation between the 1st data and the version management data associated with the 1st data;

causing, when carrying out processing on the 1st data, the data-processing apparatus to refer to the management data to identify the version management data;

causing the data-processing apparatus to use the identified version management data to determine a particular one of the 2nd data that is associated with one of the versions specified internal or external to the data-processing apparatus; and causing the data-processing apparatus to use the particular 2nd data in the processing.

According to a fourth aspect of the invention, there is provided a data-processing apparatus for carrying out communications with an integrated circuit by using a plurality of 2nd data each comprising a plurality of 1st data, the data-processing apparatus comprising:

a storage circuit including a plurality of 1st storage areas for storing the 2nd data to be accessed by 1st users associated with the 2nd data, a 2nd storage area for storing the 2nd data shared by a plurality of 1st users and a 3rd storage area for storing the 2nd data accessible only to privileged users; and a processing circuit for determining whether or not to approve an access to be made to the 1st, 2nd and 3rd storage areas of the storage circuit by using an ID of one of the 1st data and an ID of one of the 2nd data on the basis of access management data prescribing approval/disapproval of hierarchical accesses to the 1st, 2nd and 3rd storage areas of the storage circuit.

According to a fifth aspect of the invention, there is provided a data-processing method adopted in a data-processing apparatus for carrying out communications with an integrated circuit by using a plurality of 2nd data each including a plurality of 1st data, wherein the data-processing method comprises the steps of:

preparing a storage circuit including a plurality of 1st storage areas for storing the 2nd data to be accessed by 1st users associated with the 2nd data, a 2nd storage area for storing the 2nd data shared by a plurality of 1st users and a 3rd storage area for storing the 2nd data accessible only to privileged users; and determining, on the basis of access management data prescribing approval/disapproval of hierarchical accesses to the 1st, 2nd and 3rd storage areas of the storage circuit, an access approval/disapproval to the storage circuit by using an ID of one of the 1st data and an ID of one of the 2nd data.

According to a sixth aspect of the invention, there is provided a program adopted in a data-processing apparatus for carrying out communications with an integrated circuit by using a plurality of 2nd data each including a plurality of 1st data, wherein the program comprises the steps of:

preparing a storage circuit including a plurality of 1st storage areas for storing the 2nd data to be accessed by 1st users associated with the 2nd data, a 2nd storage area for storing the 2nd data shared by a plurality of 1st users and a 3rd storage area for storing the 2nd data accessible only to privileged users; and determining, on the basis of access management data prescribing approval/disapproval of hierarchical accesses to the 1st, 2nd and 3rd storage areas of the storage circuit, an access approval/disapproval to the storage circuit by using an ID of one of the 1st data and an ID of one of the 2nd data.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 7 is a table showing types of an application element APE of the application program AP shown in FIG. 6;

FIG. 8 is an explanatory diagram showing versions for the application element APE's types shown in FIG. 7;

FIG. 15 is an explanatory diagram showing an AP management table stored in the AP management storage area as a part of the data shown in FIG. 14;

FIG. 17 is an explanatory diagram showing an APP table stored as a part of the data shown in FIG. 14;

FIG. 18 is an explanatory diagram showing internal-resource allocation management data stored in the AP management storage area as a part of the data shown in FIG. 14;

FIG. 19 is an explanatory diagram showing typical items that can be set by different users in a storage area of the external memory;

FIG. 20 is an explanatory diagram showing a flowchart representing user management using the internal-resource allocation management data shown in FIG. 18;

FIG. 23 is an explanatory diagram showing the format of an IC card entity;

FIG. 31 is an explanatory diagram showing an outline of signature processing carried out by the embodiment shown in FIG. 1;

DETAILED DESCRIPTION OF THE PREFERRED EMBODIMENTS

Some preferred embodiments of the present invention are explained by referring to diagrams as follows.

Figure 1:
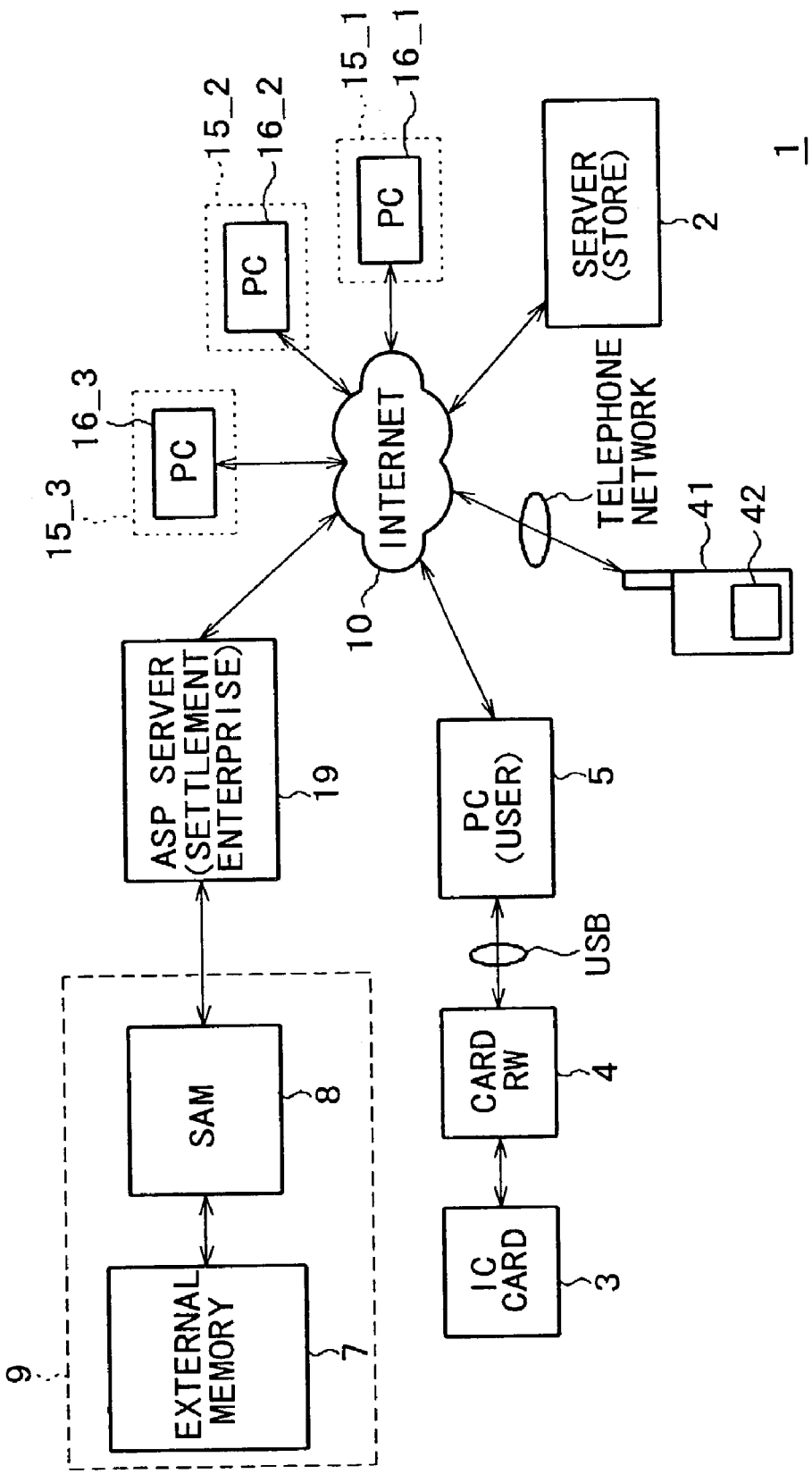
FIG. 1 is a diagram showing an overall configuration of a communication system implemented by an embodiment of the present invention.

FIG. 1 is a diagram showing an overall configuration of a communication system 1 implemented by the embodiment of the present invention.

As shown in FIG. 1, the communication system 1 carries out communication through the Internet 10 by using a server 2 installed at a store or the like, an IC card 3, a card reader/writer 4, a personal computer 5, an ASP (Application Service Provider) server 19, a SAM (Secure Application Module) unit 9 and a portable communication apparatus 41 including an embedded IC module 42 (a data-processing apparatus provided by the present invention) in order to perform procedural processing such as a settlement process using the IC card 3 or the portable communication apparatus 41.

The SAM unit 9 (a data-processing apparatus provided by the present invention) comprises an external memory 7 (a storage circuit provided by the present invention) and a SAM 8 (a data-processing apparatus provided by the present invention).

If necessary, the SAM 8 exchanges data with another SAM not shown in the figure.

Elements of the configuration shown in FIG. 1 are described as follows.

[IC Card 3 and Portable Communication Apparatus 41]

Figure 2:
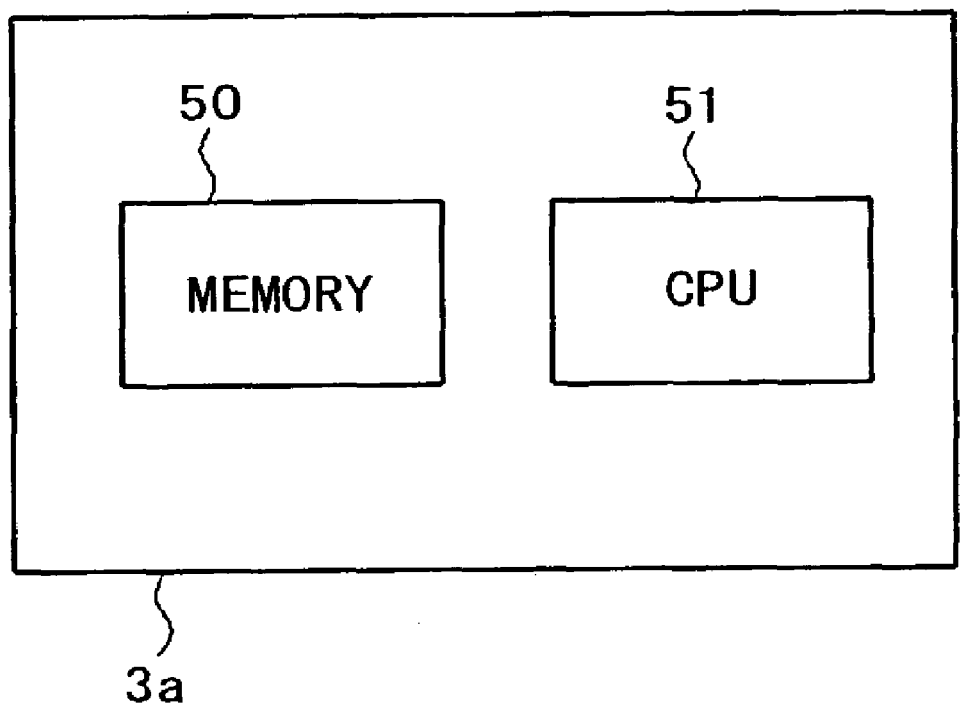
FIG. 2 is a functional block diagram showing an IC card used in the communication system shown in FIG. 1.

FIG. 2 is a functional block diagram showing the IC card 3.

As shown in FIG. 2, the IC card 3 has an IC (Integrated Circuit) module 3a including a memory 50 and a CPU 51.

Figure 3:
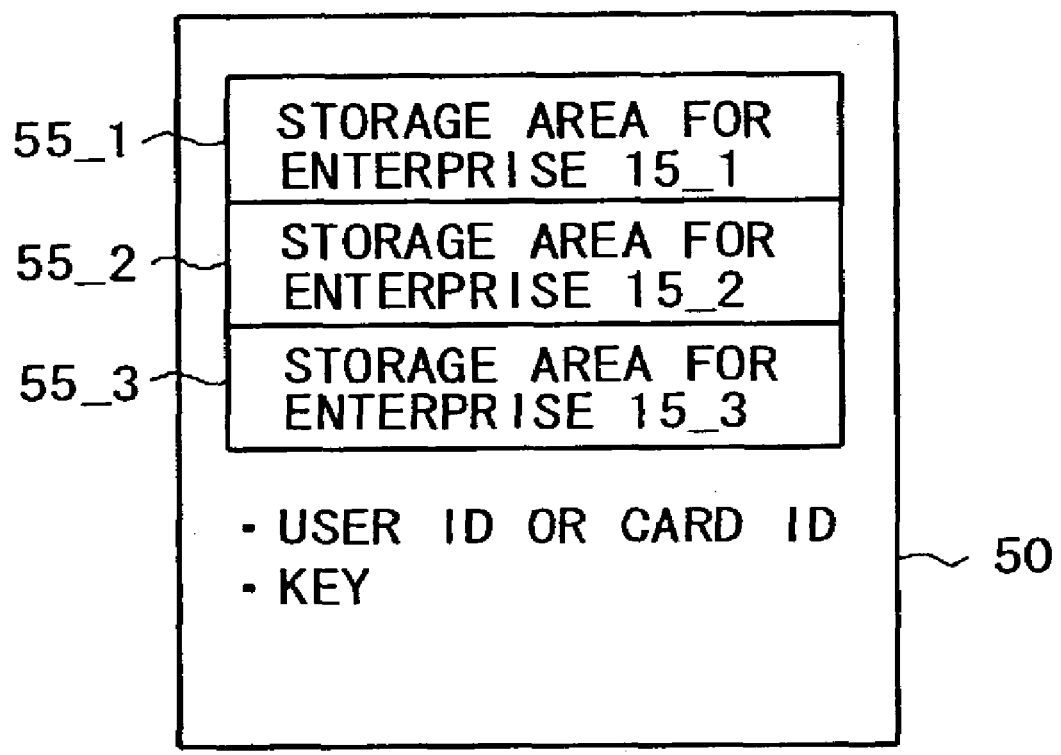
FIG. 3 is an explanatory diagram showing a memory employed in the IC card shown in FIG. 2.

As shown in FIG. 3, the memory 50 includes a storage area 55_1 used by a service-rendering enterprise 15_1 such as a credit card company, a storage area 55_2 used by a service-rendering enterprise 15_2 and a storage area 55_3 used by a service-rendering enterprise 15_3.

In addition, the memory 50 is used for storing a key used for determining a right of an access to the storage area 55_1, a key used for determining a right of an access to the storage area 55_2 and a key used for determining a right of an access to the storage area 55_3. The keys are used for, among other purposes, mutual authentication, encryption of data and decryption of data.

Furthermore, the memory card 50 is also used for storing the ID of the IC card 3 or the ID of a user of the IC card 3.

The portable communication apparatus 41 has a communication functional unit for carrying out communications with the ASP server 19 and, as described above, the IC module 42 for exchanging data with the communication functional unit, which is shown in none of the figures. The portable communication apparatus 41 also communicates with the SAM unit 9 through an antenna and the Internet 10.

The IC module 42 has the same functions as the IC module 3a employed in the IC card 3 mentioned above except that the IC module 42 also exchanges data with the communication functional unit employed in the portable communication apparatus 41.

It is to be noted that, since processing is carried out by using the portable communication apparatus 41 in the same way as processing carried out by using the IC card 3 and processing is carried out by using the IC module 42 in the same way as processing carried out by using the IC module 3a, only the processing carried out by using the IC card 3 and the processing carried out by using the IC module 3a are explained in the following description.

The SAM unit 9 is described in detail as follows.

As explained earlier, the SAM unit 9 comprises an external memory 7 (a storage circuit provided by the present invention) and a SAM 8 (a data-processing apparatus provided by the present invention).

The SAM 8 can be implemented as a semiconductor circuit or a device comprising a plurality of circuits accommodated in a box.

[Software Configuration of the SAM 8]

Figure 4:
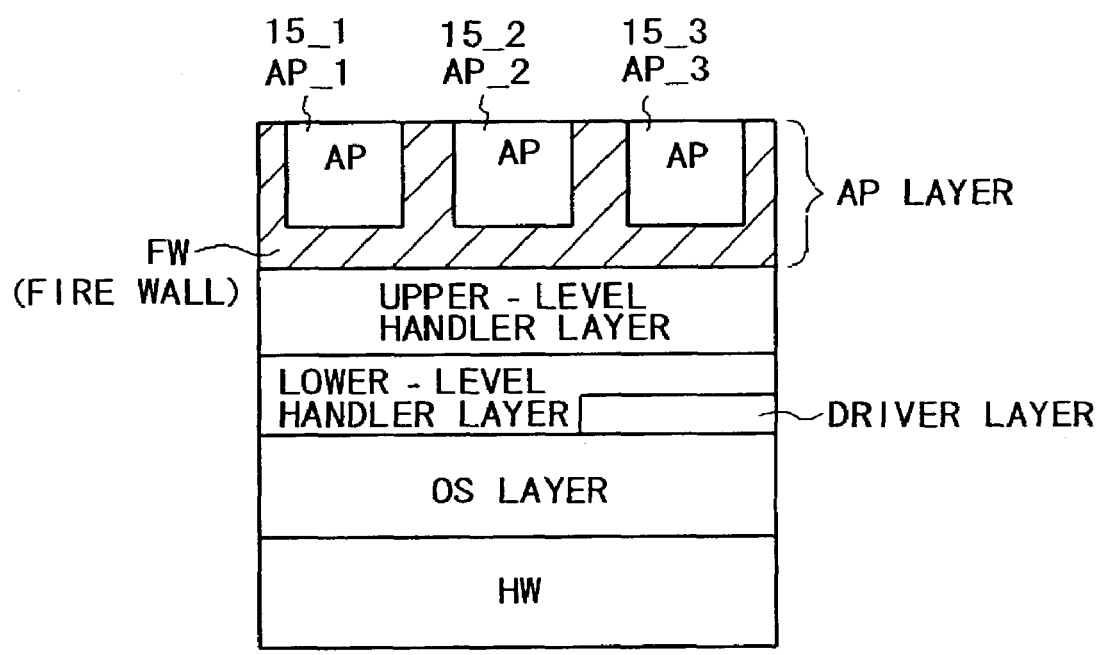
FIG. 4 is an explanatory diagram showing a software configuration of a SAM used in the communication system shown in FIG. 1.

The SAM 8 has a software configuration like one shown in FIG. 4.

As shown in FIG. 4, the SAM 8 includes a hardware (HW) layer, a drive (OS) layer, a lower-level handler layer, an upper-level handler layer and an application (AP) layer, which are stacked in the upward direction in the figure. The OS layer includes an RTOS kernel for peripheral hardware. The lower-level handler layer carries out processing in logically defined units. The upper-level handler layer includes libraries peculiar to applications.

The AP layer includes application programs AP_1, AP_2 and AP_3 (application programs provided by the present invention) prescribing procedures using the IC card 3 for respectively the service-rendering enterprises 15_1, 15_2 and 15_3 such as a credit card company shown in FIG. 1. The application programs AP_1, AP_2 and AP_3 are loaded from the external memory 7 for execution.

In each of the application programs AP_1, AP_2 and AP_3, one or more macro-scripts can be set.

At the AP layer, a firewall FW is provided between any two of the application programs AP_1, AP_2 and AP_3 and between the application programs AP_1, AP_2 and AP_3 and the upper-level handler layer.

[External Memory 7]

Figure 5:
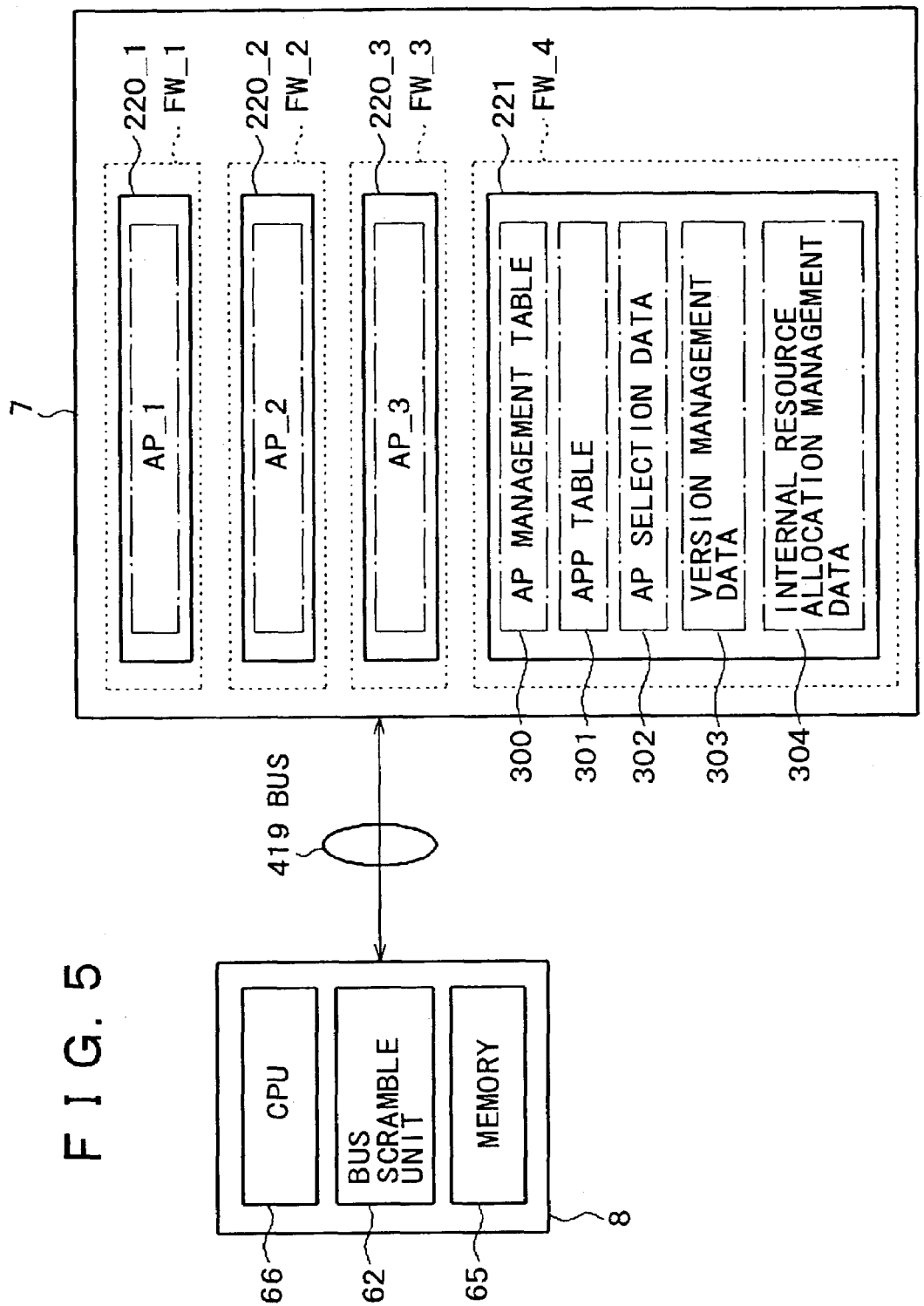
FIG. 5 is an explanatory diagram showing storage areas of an external memory used in the communication system shown in FIG. 1.

FIG. 5 is an explanatory diagram showing storage areas of the external memory 7.

As shown in FIG. 5, the storage areas of the external memory 7 are an AP storage area 220_1 for storing the application program AP_1 of the service-rendering enterprise 15_1, an AP storage area 220_2 for storing the application program AP_2 of the service-rendering enterprise 15_2, an AP storage area 220_3 for storing the application program AP_3 of the service-rendering enterprise 15_3 and an AP management storage area 221 used by a person in charge of management of the SAM 8.

The application program AP_1 (an application program according to the 1st to 3rd aspects of the present invention or second data according to the 4th to 6th aspects of the present invention) stored in the AP storage area 220_1 comprises a plurality of application elements APE (first data according to the 1st to 6th aspects of the present invention) to be described later. Accesses to the AP storage area 220_1 are restricted by a firewall FW_1.

By the same token, the application program AP_2 stored in the AP storage area 220_2 comprises a plurality of application elements APE. Accesses to the AP storage area 220_2 are restricted by a firewall FW_2.

Likewise, the application program AP_3 stored in the AP storage area 220_3 comprises a plurality of application elements APE. Accesses to the AP storage area 220_3 are restricted by a firewall FW_3.

In this embodiment, the application element APE is a minimum unit downloaded into the external memory 7 from typically a source external to the SAM unit 9. The number of application elements APE is determined arbitrarily by the service-rendering enterprise associated with the application program.

In addition, the application programs AP_1, AP_2 and AP_3 stored in the external memory 7 have been scrambled, so that when the application programs AP_1, AP_2 and AP_3 are transferred to the SAM 8, they must be de-scrambled.

Furthermore, the application programs AP_1, AP_2 and AP_3 are developed by the service-rendering enterprises 15_1, 15_2 and 15_3 respectively by using typically the personal computers 16_1, 16_2 and 16_3 respectively, which are shown in FIG. 1. Then, the application programs AP_1, AP_2 and AP_3 are downloaded to the external memory 7 by way of the SAM 8.

The application programs AP_1, AP_2 and AP_3 are explained in detail as follows.

An application program or a plurality of application programs exist in a SAM unit for each service-rendering enterprise.

Figure 6:
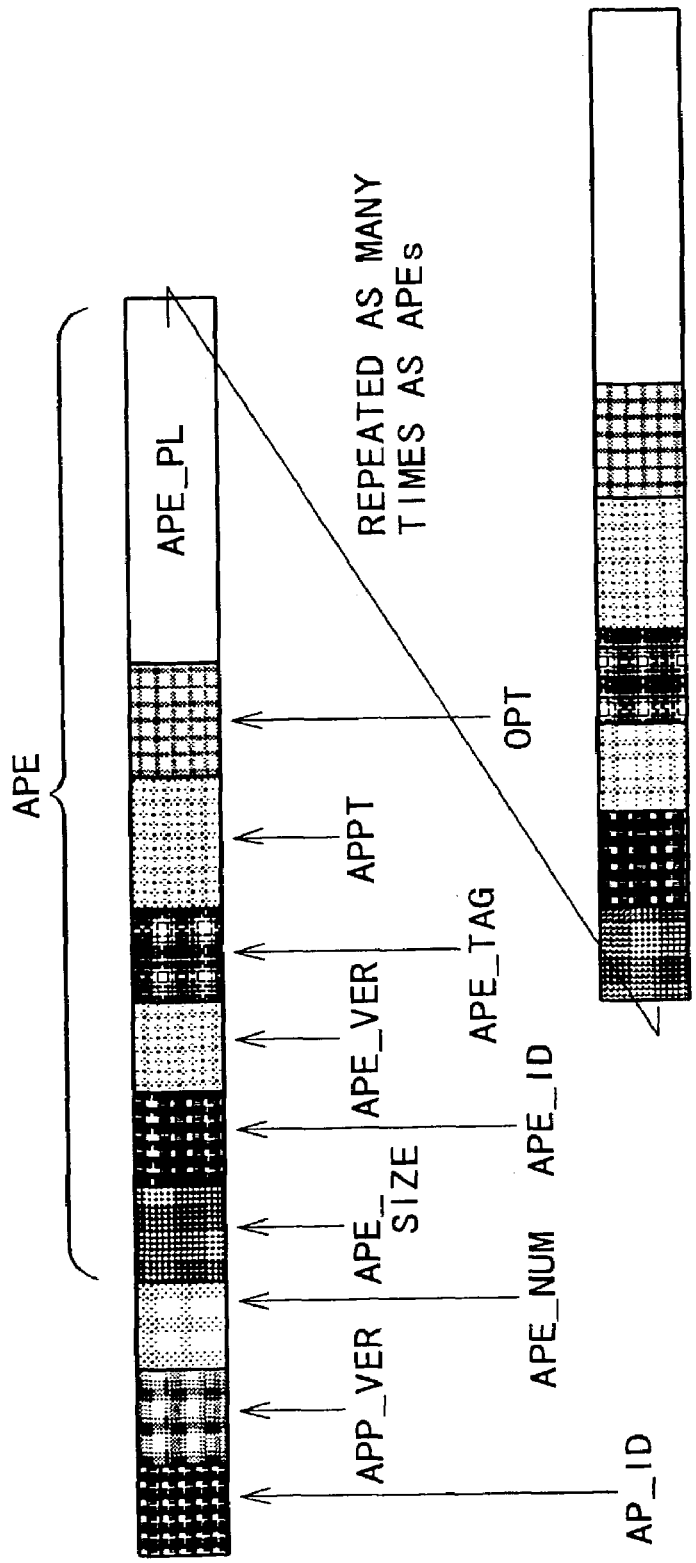
FIG. 6 is an explanatory diagram showing an application program AP stored in the external memory shown in FIG. 5.

As shown in FIG. 6, the application program AP_1, AP_2 or AP_3, which is referred to hereafter simply as an AP, comprises an identification. AP_ID, a version APP_VER, an APE count APE_NUM and an application element APE or a plurality of. application elements APE. AP_ID identifies the application program AP. APP_VER is the application program AP's version, which is information on a generation of the application program AP. APE_NUM is the number of application elements APE in the application program AP.

The identification AP_ID varies from service-rendering enterprise to service-rendering enterprise.

As shown in FIG. 6, an application element APE comprises a data size APE_SIZE, an identification APE_ID, a version APE_VER, a tag APE_TAG, a table identification APPT, an option OPT and main data APE_PL. APE_SIZE is the size of the application element APE. APE_ID identifies the application element APE. APE_VER is the version of the application element APE. APE_TAG is an identification (or a tag) of the application element APE. APE_TAG can be set by the service-rendering enterprise. APPT is used for identifying an APP table. OPT is used for specifying an option. APE_PL is the actual data of the application element APE.

The identification APE_ID comprises a type APE_TYPE and a number INS_NUM. APE_TYPE is the type of the application element APE. INS_NUM is an instance identification number serving as an identification number of the application element APE. INS_NUM is managed by the end user or the service-rendering enterprise.

Assume that the application element APE is a file system configuration. In this case, APE_TYPE is 2 and INS_NUM is 1. By using such APE_ID, each application element APE can be identified uniquely among application elements APE accommodated in the same SAM unit.

APE_VER can be set arbitrarily by the service-rendering enterprise.

In addition, it is necessary to uniquely define APE_TAG in each individual application program AP.

The application programs AP, namely, AP_1, AP_2 and AP_3, are encrypted in a device external to the SAM unit 9 by using an AP resource key K_APR as an encryption key before being stored by a setting command in the external memory 7 shown in FIG. 5 as an application program package APP.

The AP resource key K_APR varies from application program to application program.

The following description explains APE_TYPE, which is the type of the application element APE explained above by referring to FIG. 6.

FIG. 7 is a table showing typical APE_TYPE of an application element APE stored in an AP area. To be more specific, FIG. 7 is a table showing type number of APE_TYPE and their descriptions.

As shown in FIG. 7, an AP area is used for storing for example an AP resource key K_APR, a card access key, file system configuration data, a SAM mutual authentication key, an inter-SAM-key package key, an IC card operation macro-command script program (processing procedural data of the present invention), a memory-division key package, an area-recording key package, an area-deletion key package, a service-recording key package and a service-deletion key package as application element APE.

AP Resource Key K_APR

The AP resource key K_APR is used as an encryption key in setting an application element APE. The AP resource key K_APR assigned to an AP area to be used for setting an application element APE varies from AP area to AP area.

Card Access Key

A card access key is a key used in operations to write and read out data into and from the IC card 3 and the memory 50 employed in the IC module 42. The card access key can be for example an IC card system key, an IC card area key, an IC card service key or an IC card degeneration key.

The IC card degeneration key is generated by encryption using the IC card system key and a storage area management key for the memory 50 and used for mutual authentication.

In addition, key referred to by the IC card operation macro-command script program is also included in the application element APE of the same type as the card access key.

File System Configuration Data

The file system configuration data can be for example log data, negative data or journal data.

The log data is typically utilization-history data of an application element APE. The negative data is typically information on invalidation of an IC card. The journal data is typically history data of execution in the SAM unit.

In configuration of a file system, for example, an identification (specification, sorting or linking of a record key) of a file access is selected. In the case of a record key, a record size, a record overall count, a record signature version, a record signature method type, a record data size and a record signature key are set. In addition, when data is written into this file system from an external source, it is necessary to carry out processing such as an operation to specify whether or not signature authentication is to be implemented. In this case, a record is defined as a smallest unit of operations to write and read out file data.

SAM Mutual Authentication Key

The SAM mutual authentication key is used also in mutual authentication between APs in the same SAM unit. The SAM mutual authentication key is a key used in an access to the application element APE from another AP in the same SAM unit or from another SAM unit.

Inter-SAM-Key Package Key

The inter-SAM-key package key is an encryption key used in an operation to exchange data such as a card access key after mutual authentication between SAM units.

IC Card Operation Macro-Command Script Program

The IC card operation macro-command script program is created by the service-rendering enterprise itself. The IC card operation macro-command script program prescribes an order of processing related to the IC card 3 and lists exchanges with the ASP server 19. The IC card operation macro-command script program is interpreted by the SAM 8 to generate an entity of the IC card 3 after being set in the SAM unit 9.

Memory-Division Key Package

The memory-division key package is data used for dividing a storage area of the external memory 7 or a memory employed in the IC card 3 before the service-rendering enterprise starts an operation of a service using the IC card 3.

Area-Recording Key Package

The area-recording key package is data used for recording an area in a storage area of the memory employed in the IC card 3 before the service-rendering enterprise starts an operation of a service using the IC card 3.

Area-Deletion Key Package (Internally Generated)

The area-deletion key package is a package that can be automatically generated inside the SAM unit from the card access key.

Service-Recording Key Package (Internally Generated)

The service-recording key package is used for recording the application element APE into the external memory 7 before the service-rendering enterprise starts an operation of a service using the IC card 3.

The service-recording key package is a package that can be automatically generated inside the SAM unit from the card access key.

Service-Deletion Key Package (Internally Generated)

The service-deletion key package is used for deleting the application element APE from the external memory 7.

The service-deletion key package is a package that can be automatically generated inside the SAM unit from the card access key.

FIG. 8 is an explanatory diagram showing versions for the application element APE's types shown in FIG. 7.

As shown in FIG. 8, if the type of the application element APE is an IC card system key, an area key or a service key, a version prescribed in the IC card system key, the area key or the service key respectively is used.

The version of the IC card degeneration key can be prescribed originally by typically the SAM 8.

As the version of a manufacturing key, the version of the system key is used.

As the version of an issuance key, the version of a most recent key of storage areas of the IC module 42 and the IC 3a is used.

As the version of an extended-issuance key, the version of the system key is used.

As the versions of a division origin package and a division package, the version of a system key subjected to division is used.

As the versions of an area-recording key package and an area-deletion key package, the versions of their respective area keys are used.

As the versions of a service-recording key package and a service-deletion key package, the versions of their respective service keys are used.

As the version of a key modification package, the version of a new key after modification is used.

The following description explains version management data 303 used for managing the aforementioned versions of application elements APE and the application elements APE themselves. The version management data 303 is stored in the AP management storage area 221 of the external memory 7 shown in FIG. 5.

1st Embodiment of Version Management

Figure 9:
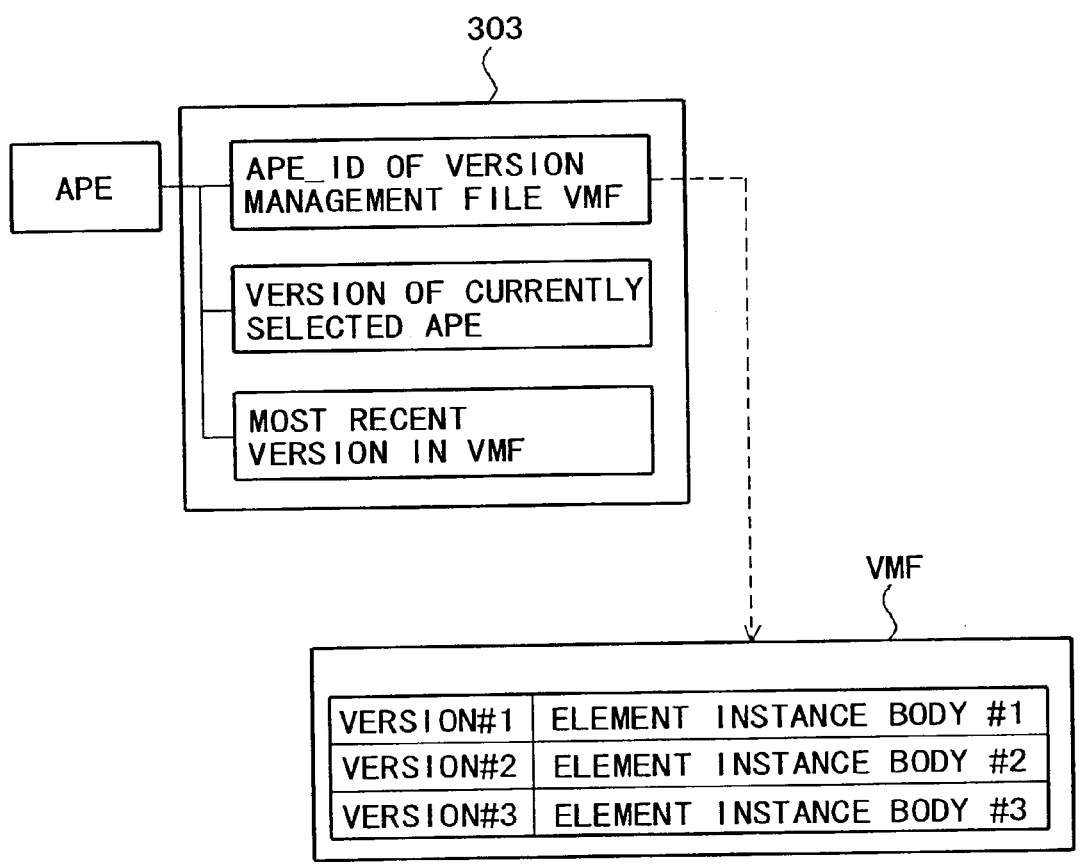
FIG. 9 is an explanatory diagram showing 1st typical management of versions of application elements in the SAM used in the communication system shown in FIG. 1.

As shown in FIG. 9, if an application element APE have a plurality of versions, the version management data 303 (the management data according to the 1st to 3rd aspects of the present invention) for the application elements APE is used for storing an identification APE_ID of a version management file VMF (the version management data according to the 1st to 3rd aspects of the present invention) for the application element APE, the version of a currently selected application element APE and a most recent version stored in the version management file VMF.

In this embodiment, the version management file VMF is implemented as an application element APE.

As shown in FIG. 9, the version management file VMF is used for storing the values of an application element APE's versions or the application element APE's version identification data each denoted by symbol Version #★★ and for storing element instance bodies (the 2nd data according to the 1st to 3rd aspects of the present invention) of the application element APE of the versions. The element instance bodies of the application element APE are each denoted by symbol Element Instance Body #★★.

If an application element APE having a plurality of versions is used, a CPU employed in the SAM 8 uses the identification AP_ID of the application element APE as a basis for making an access to the version management data 303 in order to use APE_ID stored in the version management data 303 as a basis for making an access to the version management file VMF. The CPU then uses a specified version of the application element APE as a key to search the version management file VMF for the application element APE's element instance body associated with the version.

[2nd Embodiment of Version Management]

Figure 10:
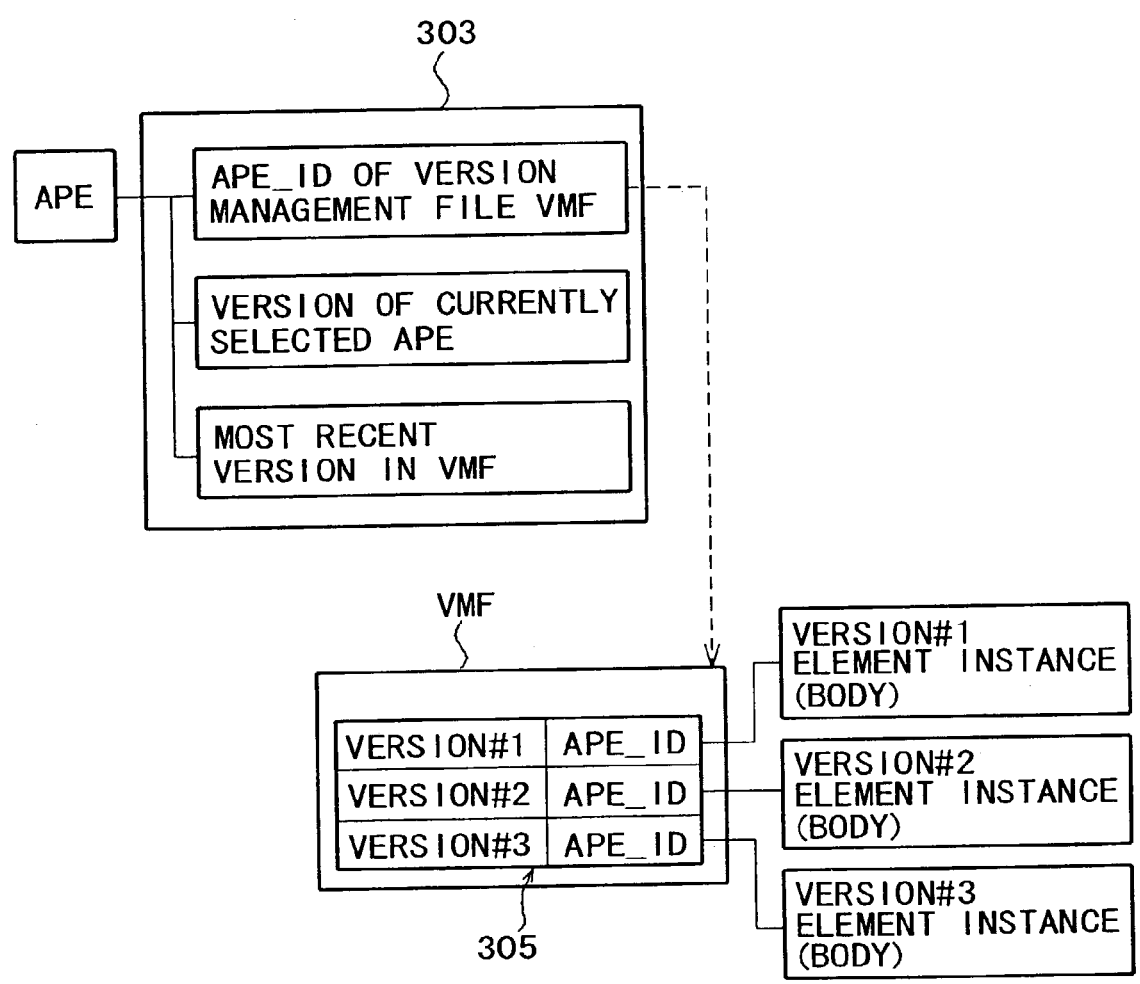
FIG. 10 is an explanatory diagram showing 2nd typical management of versions of application elements in the SAM used in the communication system shown in FIG. 1.

As shown in FIG. 10, the version management data 303 for the application elements APE is used for storing an identification APE_ID of a version management file VMF for the application element APE, the version of a currently selected application element APE and a most recent version stored in the version management file VMF as is the case with the 1st embodiment shown in FIG. 9.

Also in the case of the second embodiment, the version management file VMF is implemented as an application element APE.

As shown in FIG. 10, the version management file VMF is used for storing the values of an application element APE's versions or the application element APE's version identification data each denoted by symbol Version #★★ and for storing identifications APE_IDs of element instance bodies (the 2nd data according to the 1st to 3rd aspects of the present invention) of the application element APE of the versions as a table 305. The element instance bodies of the application element APE are each denoted by symbol Element Instance Body #★★.

If an application element APE having a plurality of versions is used, the CPU employed in the SAM 8 uses the identification AP_ID of the application element APE as a basis for making an access to the version management data 303 in order to use APE_ID stored in the version management data 303 as a basis for making an access to the version management file VMF. The CPU then uses a specified version of the application element APE as a key to search the version management file VMF for an identification APE_ID associated with the version. Finally, the CPU uses the identification APE_ID to make an access to the application element APE's element instance body associated with the identification APE_ID and utilizes the element instance body.

It is to be noted that, in the first and second embodiments, a version specification can be set or changed by a command received from a source external to the SAM 8 or as a result of internal processing of the SAM 8. In addition, it is also possible to provide an alternative implementation wherein, if a version is not specified explicitly, the CPU employed in the SAM 8 automatically selects a most recent version stored in the version management file VMF. As described above, information in the most recent version is included in the version management data 303.

As another alternative, the CPU employed in the SAM 8 finds a version value by reflecting a value specified internal or external to the SAM 8 in a value indicated by version-specification data, and uses the version value as a key for searching the version management file VMF.

[Application of the Version Management]

Figure 11:
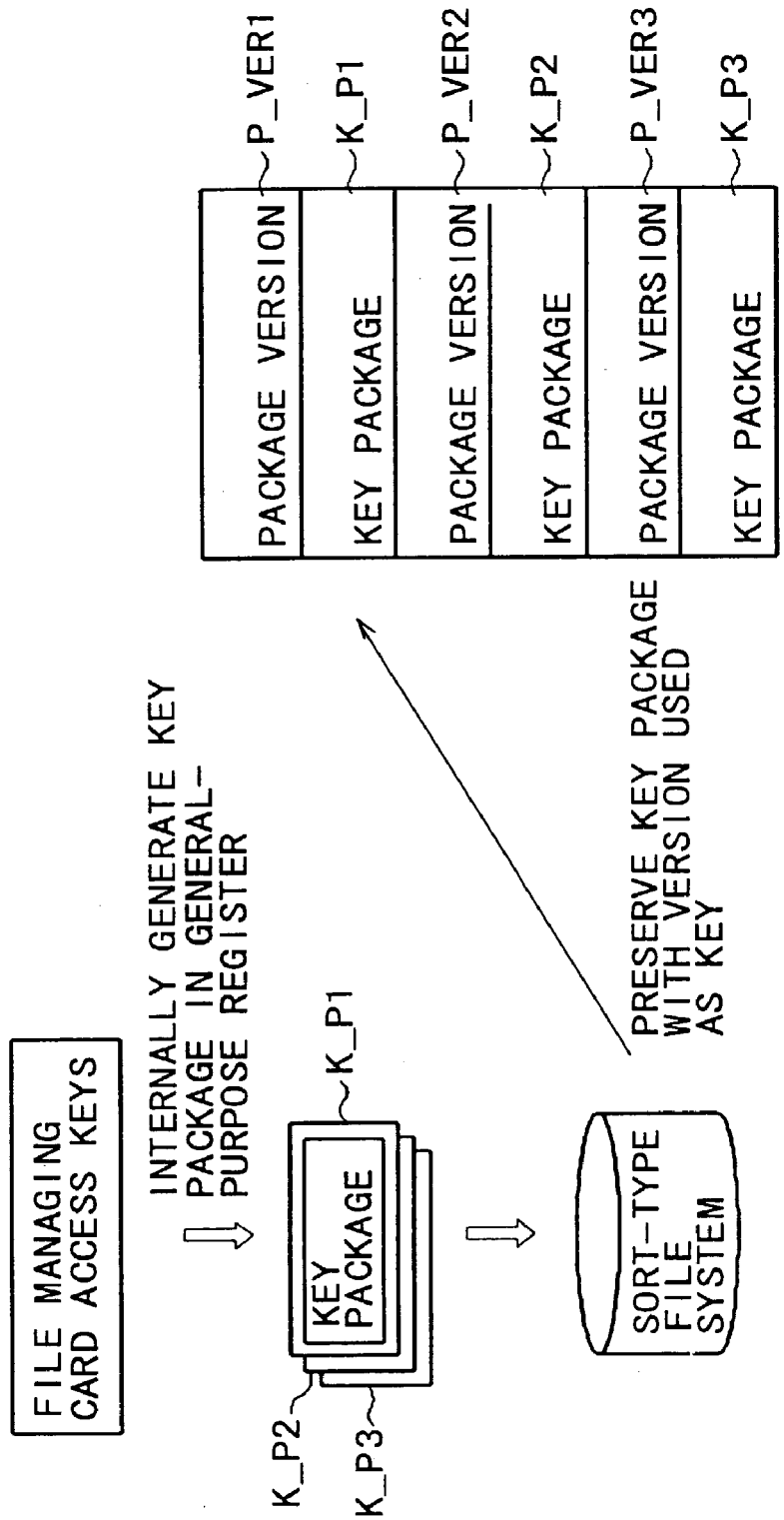
FIG. 11 is an explanatory diagram showing an application of the 1st typical management of versions shown in FIG. 9.
Figure 12:
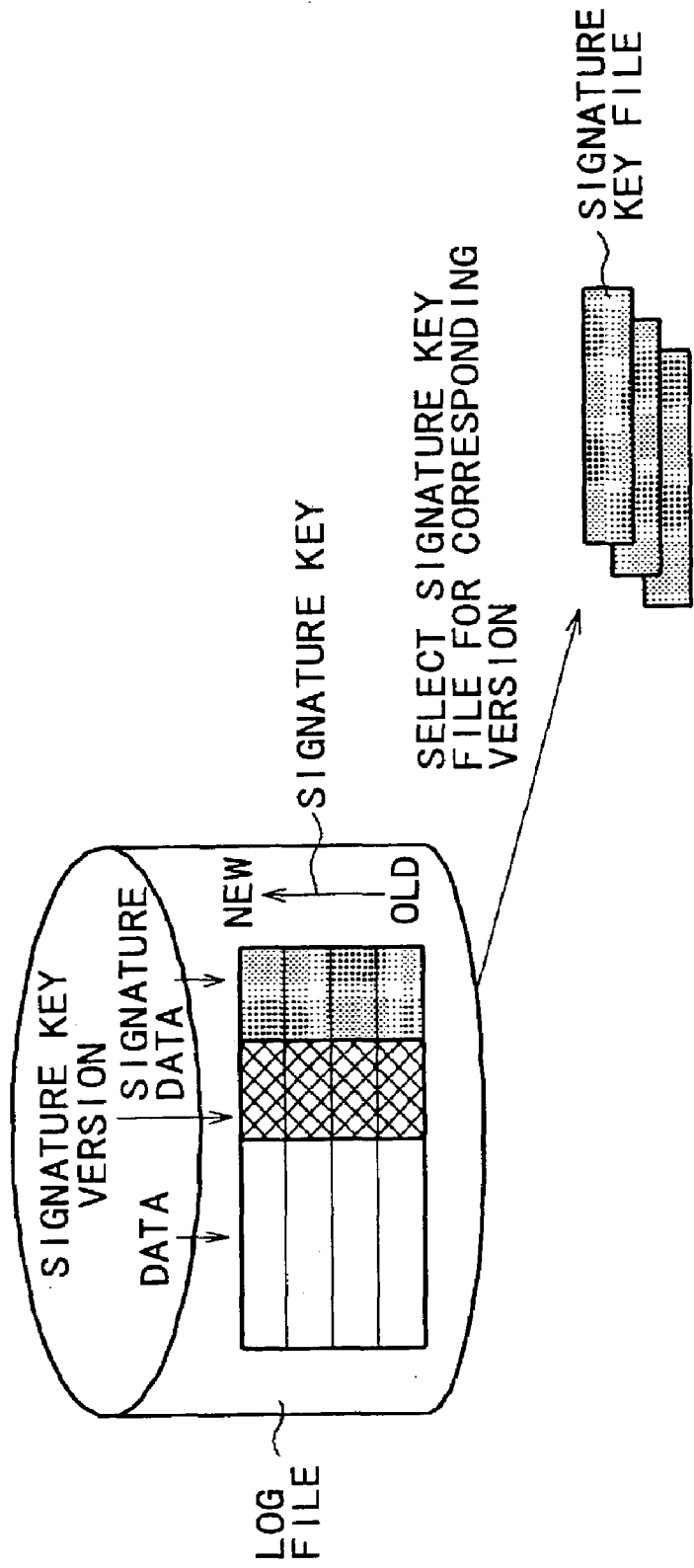
FIG. 12 is an explanatory diagram showing management of versions of log data.

FIG. 11 is an explanatory diagram showing a case in which the version management technique is applied to card access keys.

As shown in FIG. 11, a key package K_P is internally generated in a general-purpose register employed in the SAM 8 from a file for managing card access keys. To put it in detail, key packages K_P1 to K_P3 each including card access keys of different versions are generated.

Then, the CPU employed in the SAM 8 uses a sort-type file to store the key packages K_P1 to K_P3 in the external memory 7 by associating the key packages K_P1 to K_P3 with package versions P_VER1 to P_VER3 respectively.

[Creation and Authentication of Signature (Log) Data Signed by Using Signature Keys of Different Versions]

For example, there is a case in which a signature key used in a signature accompanying processing changes typically after a start of an operation of the IC card 3 and the IC module 42 so that the operation must be carried out in the SAM 8 with a new signature key coexisting with an updated key.

In such a case, the signature keys are managed by version.

The CPU employed in the SAM 8 reads out a signature key version included in a record of a signature file and uses the signature key version as a key to search the signature file for a signature key. The CPU then uses the obtained signature key for creation of a signature or processing to authenticate a signature.

That is to say, the CPU employed in the SAM 8 identifies a signature key version in a log file typically at a file-configuration time and uses the version management file VMF to make an access to a signature key file corresponding to the signature key version. The CPU then uses the signature key stored in the signature key file for creation of a signature or processing to authenticate a signature.

It is to be noted that the log file cited above is used for storing data to which a signature is to be added and the signature in a record format for the signature key version. The signature is put on a part or all of the data to which the signature is to be added.

In addition, the CPU employed in the SAM 8 generates a signature key and a signature based on a predetermined encryption algorithm for a part or all of the data in the log file and adds the signature to the record to be stored in the external memory 7 in a write operation. In an operation to read out the data from the log file, on the other hand, a signature key used in the write operation and a signature based on the predetermined encryption algorithm are generated, and the generated signature is compared with the signature added to the record in a write operation in order to form a judgment on the validity of the data by determining whether or not the data has been falsified or the data is deficient.

The following description explains details of the macro command script program, which is also referred to hereafter simply as a script program, for IC card operations.

The script program is a program prescribing a procedure of processing to be carried out by the IC module 3a employed in the IC card 3 and the IC module 42 employed in the portable communication apparatus 41 in execution of the application programs AP_1, AP_2 and AP_3 of the service-rendering enterprises 15_1, 15_2 and 15_3 respectively as well as the corresponding application program, which are running in the SAM 8.

Figure 13:
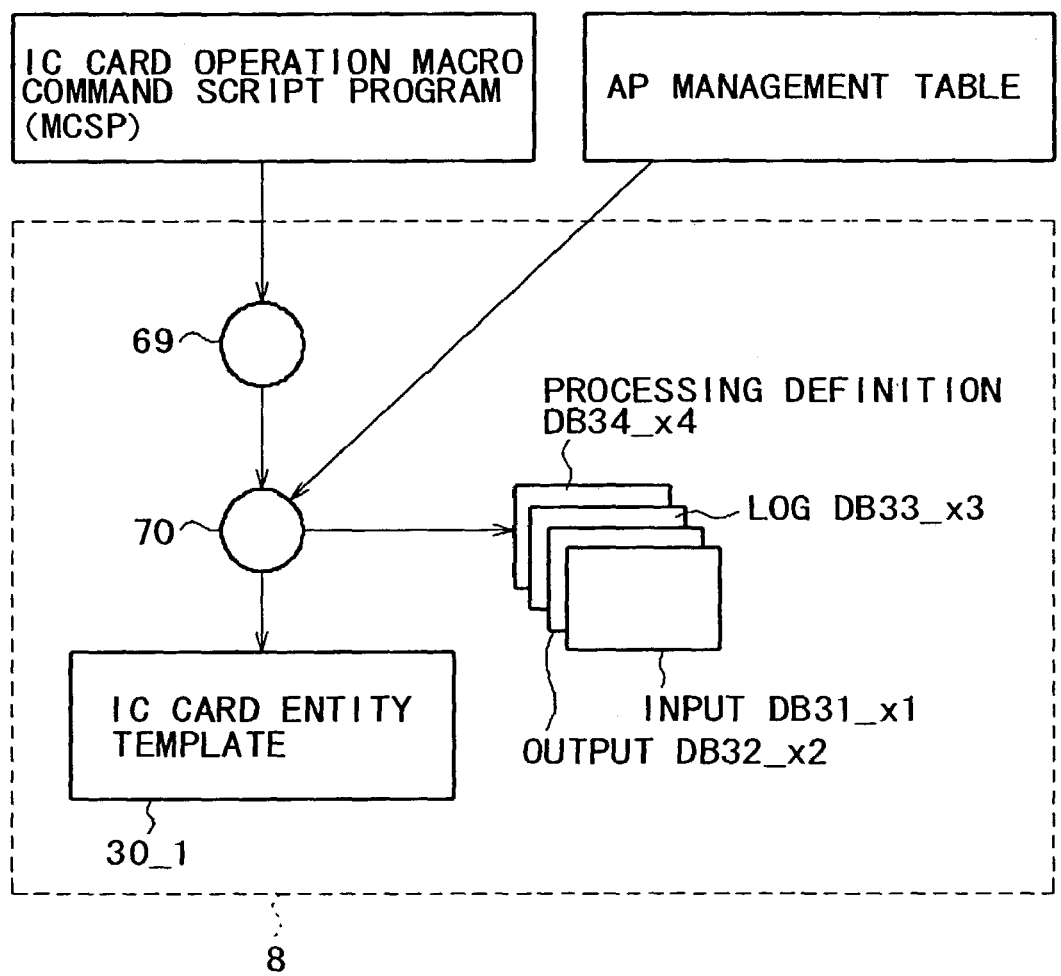
FIG. 13 is an explanatory diagram showing a command used in an IC card operation macro command script program.

In the case of this embodiment, as will be described later, processing is carried out on the basis of a script download task 69 and a script interpretation task 70 in the SAM 8 to generate pieces of data from an AP management table and data provided by the script program as shown in FIG. 13. The pieces of data include an input data block 31_x1, an output data block 32_x2, a log data block 33_x3, a processing-definition data block 34_x4 and an IC card entity template 30_1 to be used in procedures related to the service-rendering enterprises 15_1, 15_2 and 15_3.

The following description explains data stored in an AP management storage area 221 of the external memory 7 shown in FIG. 5. An access to the AP management storage area 221 is restricted by a fire wall FW_4. It is to be noted that the fire wall FW_4 corresponds to the fire wall FW shown in FIG. 4.

Figure 14:
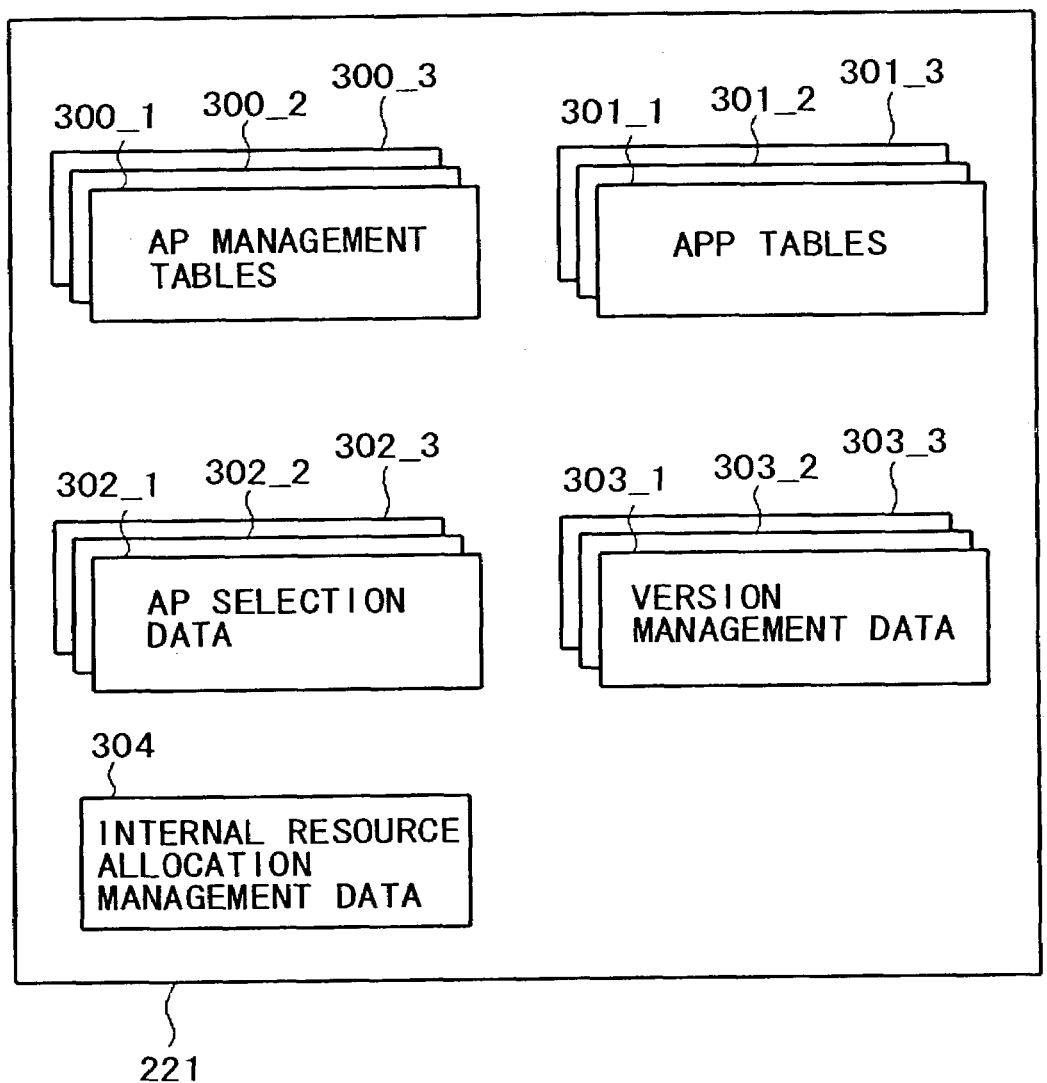
FIG. 14 is an explanatory diagram showing details of data stored in an AP management storage area shown in FIG. 5.

FIG. 14 is an explanatory diagram showing details of the data stored in the AP management storage area 221. As shown in FIG. 14, the management storage area 221 is used for storing AP management tables 300_1, 300_2 and 300_3, APP tables 301_1, 301_2 and 301_3, pieces of selection data 302_1, 302_2 and 302_3, pieces of version management data 303_1, 303_2 and 303_3 as well as internal resource allocation management data 304 (access management data according to the 4th to 6th aspects of the present invention). It is to be noted that reference numeral 300 is a generic reference numeral for denoting any one of the AP management tables 300_1, 300_2 and 300_3. By the same token, reference numeral 301 is a generic reference numeral for denoting any one of the APP tables 301_1, 301_2 and 301_3. In the same way, reference numeral 302 is a generic reference numeral for denoting any one of the pieces of selection data 302_1, 302_2 and 302_3. Likewise, reference numeral 303 is a generic reference numeral for denoting any one of the pieces of version management data 303 1, 303_2 and 303 3.

The AP management tables 300_1, 300_2 and 300_3 as well as the APP tables 301_1, 301_2 and 301_3 are recorded in advance typically at a set-up time of the SAM 8. In addition, the AP management tables 300_1, 300_2 and 300_3 as well as the APP tables 301_1, 301_2 and 301_3 can be rewritten only by a person in charge of management of the SAM 8.

The AP management tables 300_1, 300_2 and 300_3 are prescribed for each application program AP. In addition, the APP tables 301_1, 301_2 and 301_3 are prescribed for each SAM mutual authentication key.

FIG. 15 is an explanatory diagram showing the AP management table 300_1. The AP management tables 300_2 and 300_3 each have the same format as the AP management table 300_1.

As shown in FIG. 15, the AP management table 300_1 includes the name APE_N of each application element APE used and referenced by the IC-card-operation macro-command script program as well as an identification APE_ID, an internal/external identifier IEI, a partner identification SAM_ID, a partner identification AP_ID, a key K_CARDA, a key K_SAM, data SET_APP, data FLAG_IP and data FLAG_STR, which are associated with the name APE_N.

The name APE_N of each application element APE is a name given to a service (an application element APE) provided by an application program of the service-rendering enterprise 15_1, 15_2 or 15_3. The name APE_N is an identifier referenced as a substitute for the service number of a service that can be used by the application program of each service-rendering enterprise.

The identification APE_ID is the ID of an application element APE.

The internal/external identifier IEI is a flag indicating an internal specification, which means that the entity of the application element APE exists or an external specification meaning that a reference is made from another SAM unit.

The identification SAM_ID is the SAM_ID of the partner with which data is exchanged when the SAM 8 carries out processing related to the application element APE.

Figure 16:
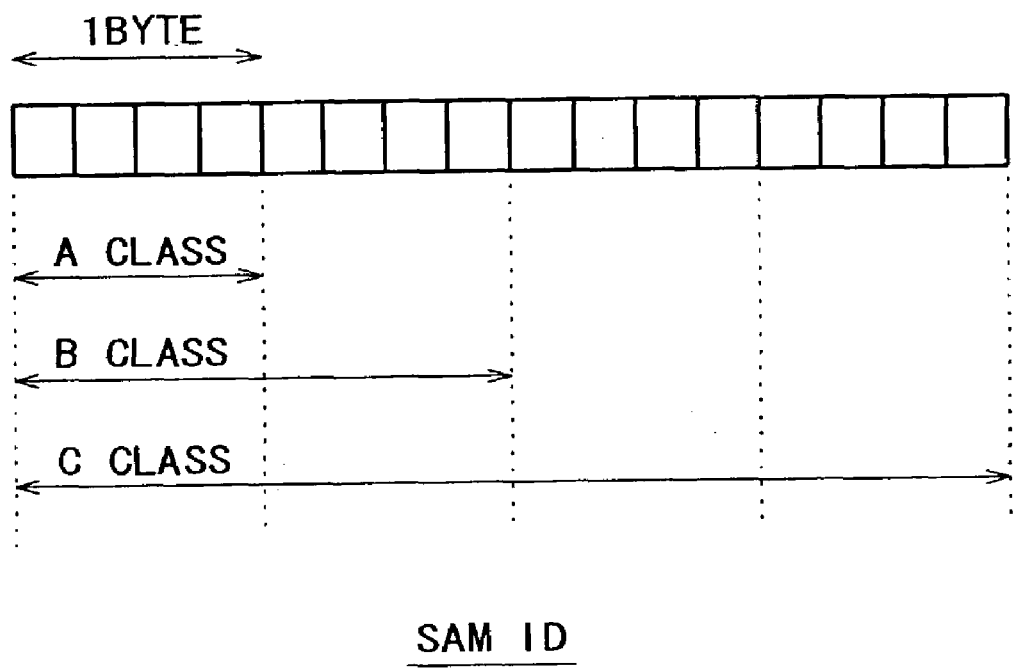
FIG. 16 is an explanatory diagram showing an identification SAM_ID.

FIG. 16 is an explanatory diagram showing the identification SAM ID.

The identification SAM_ID has a size of 4 bytes, adopting a net mask's concept similar to the TCP/IP. Each bit of a net mask can be set individually.

Net masks are classified into typically 3 types, namely, classes A, B and C, as shown in FIG. 16. A type of key can be used for mutual authentication between SAM units to which the same net mask is assigned. In this embodiment, for example, the same net mask is assigned to a service-rendering enterprise.

In FIG. 16, the net mask of class A is "255.XX.XX.XX." The high-order byte of the net mask is used for storing a predetermined value of 255 for identifying class A to which the net mask pertains. The remaining 3 low-order bytes are used for storing a value for individually identifying a SAM unit pertaining to class A. XX in any of the low-order bytes represents any 1-byte pattern. Thus, the net mask can be used to prescribe 16,777,215 different SAM-IDs pertaining to class A.

The net mask of class B is "255.255.XX.XX." The 2 high-order bytes of the net mask are used for storing a predetermined value of "255.255" for identifying class B to which the net mask pertains. The remaining 2 low-order bytes are used for storing a value for individually identifying a SAM unit pertaining to class B. Thus, the net mask can be used to prescribe 65,535 different SAM_IDs pertaining to class B.

The net mask of class C is "255.255.255.XX." The 3 high-order bytes of the net mask are used for storing a predetermined value of "255.255.255" for identifying class C to which the net mask pertains. The remaining low-order byte is used for storing a value for individually identifying a SAM unit pertaining to class C. Thus, the net mask can be used to prescribe 255 different SAM_IDs pertaining to class C.

The identification AP_ID is the identification of an application program executed in the SAM unit of the partner with which data is exchanged when the SAM 8 carries out processing related to the application element APE.

The key K_CARDA is a key, which is used for exchanging data with the memory 50 employed in the IC card 3 when the SAM 8 carries out processing related to the application element APE.

The key K_SAM is a key, which is used for exchanging data with another SAM unit when the SAM 8 carries out processing related to the application element APE.

The data SET_APP is data for identifying the APP table 301_1, 301_2 or 301_3, which is used or referred to when the SAM 8 carries out processing related to the application element APE.

APE_N's "Service A" shown in FIG. 15 is an access key of the IC card 3 defined by an application program in the SAM 8. Key "Service A" is set as an undisclosed key so that this key cannot be referred to by an application program of another SAM unit and another application program of the same SAM unit.

Service C is an access key of the IC card 3 defined by this application program. If a net mask of class C described earlier is assigned to this SAM unit, key "Service C" is disclosed to an application program in a SAM unit having SAM_ID of "43.17.19.XX." In this case, the SAM mutual authentication key is "TT1 . . . TTn" or another SAM unit determines whether or not key "Service C" can be held till the next utilization. If key "Service C" can be held till the next utilization, it is not necessary to again obtain a card access key from this SAM unit when another SAM unit uses key "Service C" on the card at the next utilization. Access key "Service B" is obtained not from this SAM unit but from a SAM unit having SAM_ID of "43.13.137.XX." As a mutual authentication key between SAM units, a key of "SS1 . . . SSn" is used.

A determination flag specified by the other SAM unit determines whether or not access key "Service B" can be held till the next utilization.

"Service B Log" points to a file for storing log data to which SAM_ID of "43.13.137.XX" is assigned. Since "Service B Log" has the same SAM net mask as "Service B", as a mutual authentication key, a key of "SS1 . . . SSn" is used. For each mutual authentication key, an APP table is provided. In this embodiment, permission of accesses to "Service B Log" and "Service B" is prescribed by the APP table 301 of another SAM unit referred to by an AP management table of the other SAM unit.

FIG. 17 is an explanatory diagram showing the APP table 301_1. The APP tables 301_2, 301_3 and 301 have the same format as the APP table 301_1.

As shown in FIG. 17, the APP table 301_1 includes an identification APE_ID, a READ flag, a WRITE flag and an EXECUTE flag, which are provided for each application element APE. APE_ID is the identification of the application element APE. The READ flag indicates whether another application program (or another application element APE) has a read access to the application element APE. The WRITE flag indicates whether another application program (or another application element APE) has a write access to the application element APE. The EXECUTE flag indicates whether another application program (or another application element APE) has an execute access to the application element APE.

For example, the APP table 301_1 shown in FIG. 17 indicates that another application program (or another application element APE) has a read access and a write access but no execute (delete) access to "Service B Log."

In addition, the AP management storage area 221 of the external memory 7 shown in FIG. 5 is used for storing typically AP selection data by associating the AP selection data with an IC card type and AP_ID.

The IC card type is the type of the IC card 3 shown in FIG. 1. An example of the IC card type is an identification of a credit-card company having transaction settlement businesses using the IC card 3.

In this embodiment, the names APE_N of a plurality of application elements APE in an IC card operation macro-command script program are combined to prescribe a service, and the prescription of the service is reflected in an IC card entity (job management data) to be described later. Thus, a combination of services corresponding to the application elements APE can be rendered as the prescribed service.

For example, a service to read out data from the IC card 3 is combined with a service to write data into the server 2 to provide a combined service, which can be defined in an IC card entity.

In addition, APE_N or a service number is an operation command that is issued to the IC card 3 and can be interpreted by the IC card 3 when a service rendered by the service-rendering enterprise 15_1, 15_2 or 15_3 is processed.

The application program AP_1 is prescribed by the IC card operation macro-command script program and the AP management table 300_1 stored in the external memory 7.

By the same token, the application program AP_2 is prescribed by the IC card operation macro-command script program and the AP management table 300_2 stored in the external memory 7.

In the same way, the application program AP_3 is prescribed by the IC card operation macro-command script program and the AP management table 300_3 stored in the external memory 7.

In addition, the AP management storage area 221 of the external memory 7 shown in FIG. 5 is used for storing internal resource allocation management data 304 used for executing management of accesses to resources typically in the external memory 7 for each user privilege or for each usage purpose.

FIG. 18 is an explanatory diagram showing the internal resource allocation management data 304. The CPU employed in the SAM 8 manages accesses to the storage area of the external memory 7 and accesses to data stored in the storage area on the basis of the internal resource allocation management data 304 for each user privilege or for each usage purpose.

The storage area of the external memory 7 is managed by dividing the storage area into a system area and a user area.

The system area is an area used in an internal operation of the SAM 8. For example, a person in charge of shipping of the SAM 8 initially sets a device number unique to the SAM 8 and a shipping key of an application program AP in the system area.

On the other hand, the user area is an area in which the user of the SAM 8 is allowed to set a resource such as an application program. The user area is classified into 3 large categories, namely, a privileged-user area (a 3rd storage area provided by the present invention), a general-user area (a 1st storage area provided by the present invention) and a common-user area (a 2nd storage area provided by the present invention).

The privileged-user area is an area used for storing basic data for operating the SAM 8. An example of the basic data is the ID of the SAM 8.

The general-user area is an area used for storing resources such as a key and a key package, which are used in implementation of a service using the IC card 3 and the portable communication apparatus 41.

The common-user area is an area used for storing network information used by general users as information common to the general users. An example of the network information is the IP address of the main unit of the SAM 8.

That is to say, the privileged-user area is an area, data of which needs to be set by a specific user for the operation of the SAM 8. The common-user area is an area that can be shared by SAMs 8 themselves and also an area, data of which can be set by a plurality of users.

FIG. 19 is an explanatory diagram showing typical items that can be set by users in the storage area of the external memory 7. As shown in FIG. 19, the person in charge of shipping of the SAM 8 is allowed to make an access to storage areas corresponding to identifications AP_ID of 0x0000 to 0x000F, set a shipping key of the AP resource key K_APR for general users and set a device key unique to the SAM 8.

In addition, a privileged user is allowed to make an access to a storage area corresponding to an identification AP_ID of 0xFFFE, set SAM_ID of the SAM 8 and set a privileged-user AP area operation key.

Furthermore, a general user is allowed to make an access to an area identified by an identification AP_ID of 0xFFFD as a user common area and also allowed to make an access to an area identified by an identification AP_ID of 0x0000 to 0x000F as a general-user area. A general user is allowed to set the net mask of SAM_ID of the SAM 8, network information such as the IP address of the SAM 8, an AP resource key K_APR and another application element APE in these areas.

The user is allowed to change a received AP resource key K_APR of a storage area disclosed to the user to another value known only by the user so that another user is not capable of modifying a resource inside the application program AP.

In addition, the user common area can be accessed by users by using a common key, that is, the AP resource key K_APR used for setting data in the general user area.

The above storage areas of the external memory 7 are managed by using the internal resource allocation management data 304 shown in FIG. 18, the identifications AP_ID and the identifications APE_ID. To put it in detail, the storage areas are managed by dividing the external memory 7 into storage areas forming a matrix prescribed by using the identifications AP_ID and APE_ID.

In the case of the external memory 7 shown in FIG. 18, a storage area with APE_ID in the range 0x7F06 to 0xFFFF is used as the system area and a storage area with APE_ID in the range 0x0000 to 0x7F00 is used as the general-user area.

In addition, a storage area of an application program with AP_ID of 0xfffd is used as the general-user common area.

As for application elements APE, encrypted packages set for areas are stored in the external memory 7. In this case, it is possible to select and encrypt only required resource elements.

The following procedure is a procedure executed by the CPU employed in the SAM 8 to manage storage areas (or resources) of the external memory 7 by using the internal resource allocation management data 304.

FIG. 20 is an explanatory diagram showing a flowchart representing the procedure.

Step ST61:

For example, a general user or a privileged user such as any one of the service-rendering enterprises 15_1 to 15_3 shown in FIG. 1 operates a personal computer connected to the Internet 10 and specifies an application program AP making accesses to the external memory 7. The application program AP makes an access to the SAM 8 through the ASP server 19 by using an AP resource key K_APR owned by the user.

Step ST62:

The CPU employed in the SAM 8 forms a judgment as to whether or not the originator of the access made at the step ST61 has an AP resource key K_APR suitable for the specified application program AP. If the outcome of the judgment indicates that the originator of the access has a suitable resource key K_APR, the procedure goes on to processing of a step ST64. If the outcome of the judgment indicates that the originator of the access does not have a suitable resource key K_APR, on the other hand, the procedure goes on to processing of a step ST63.

Step ST63:

The CPU employed in the SAM 8 does not allow the user to set an application element APE in the specified application program AP.

Step ST64:

The CPU employed in the SAM 8 allows the user to set an application element APE in the specified application program AP.

Step ST65:

The CPU employed in the SAM 8 forms a judgment as to whether or not the user is a privileged user. If the outcome of the judgment indicates that the user is a privileged user, the procedure goes on to processing of a step ST66. If the outcome of the judgment indicates that the user is not a privileged user, on the other hand, the procedure goes on to processing of a step ST67.

Step ST66:

The CPU employed in the SAM 8 allows the user to set an application element APE for a privileged user in the specified application program AP.

Step ST67:

The CPU employed in the SAM 8 forms a judgment as to whether or not the user is a general user. If the outcome of the judgment indicates that the user is a general user, the procedure goes on to processing of a step ST68. If the outcome of the judgment indicates that the user is not a general user, on the other hand, the procedure goes on to processing of a step ST69.

Step ST68:

The CPU employed in the SAM 8 allows the user to set an application element APE for a general user and an application element APE common to general users in the specified application program AP.

Step ST69:

The CPU employed in the SAM 8 allows the user to set an application element APE in the system area.

[SAM 8]

The SAM 8 is connected to the ASP server 19 through the SCSI or the Ethernet. The ASP server 19 is connected to a plurality of terminals including the personal computer 5 of the end user and the personal computers 16_1, 16_2 and 16_3 of the service-rendering enterprises 15_1, 15_2 and 15_3 respectively through the Internet 10.

The personal computer 5 is connected to a Dumb-type card reader/writer 4 by a serial or USB cable. Between the card reader/writer 4 and the IC card 3, typically, radio communication corresponding to a physical level is implemented.

An operation command given to the IC card 3 is generated by the SAM unit 9. On the other hand, a response packet generated by the IC card 3 is interpreted by the SAM unit 9. Thus, the card reader/writer 4, the personal computer 5 and the ASP server 19 between the IC card 3 and the SAM unit 9 merely play the role of relaying the command and the response by storing them in a data payload unit. That is to say, the card reader/writer 4, the personal computer 5 and the ASP server 19 do not contribute to operations such as encryption and decryption of data in the IC card 3 and authentication.

The personal computers 16_1, 16_2 and 16_3 allow their respective application programs AP_1, AP_2 and AP_3 to be customized by downloading a script program to be described later into the SAM 8.

Figure 21:
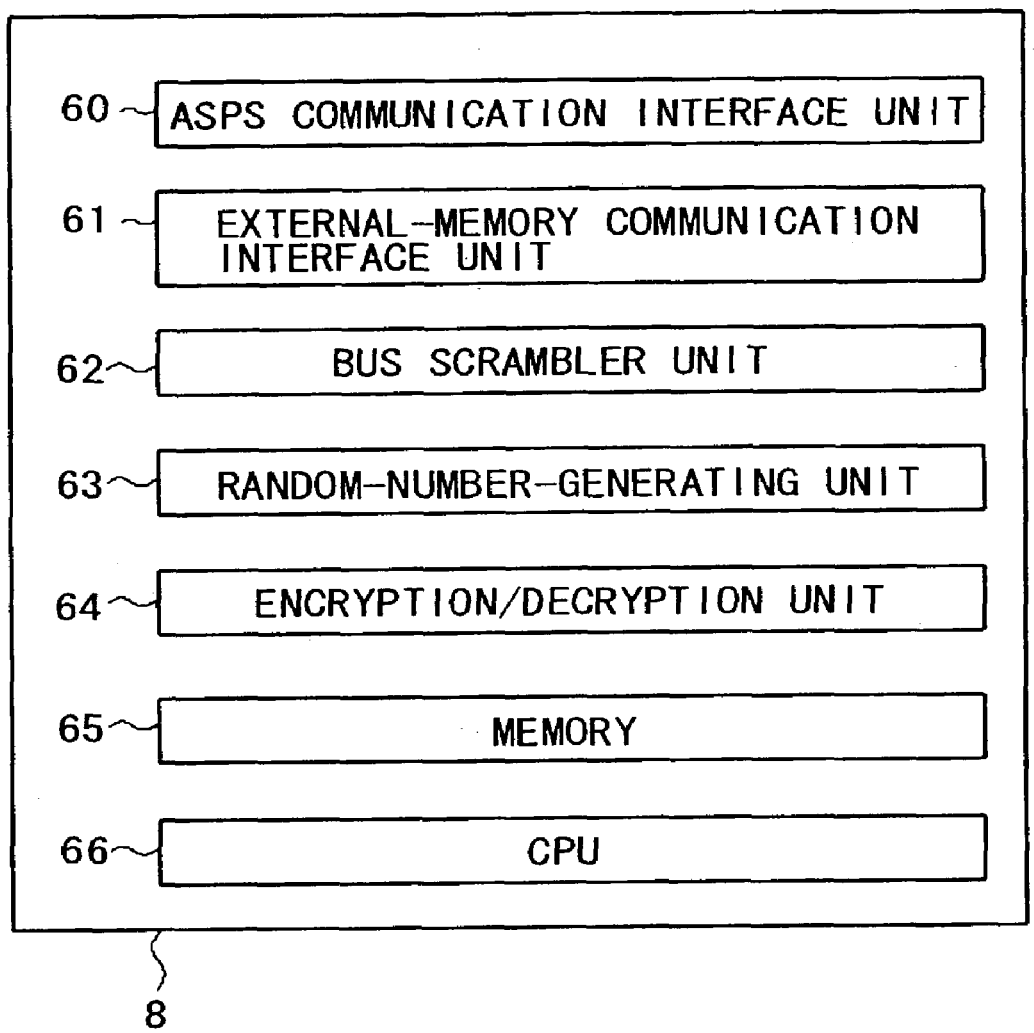
FIG. 21 is a functional block diagram showing the SAM used in the communication system shown in FIG. 1.

FIG. 21 is a functional block diagram showing the SAM 8 of the communication system shown in FIG. 1. As shown in FIG. 21, the SAM 8 comprises an ASPS communication interface unit 60, an external-memory communication interface unit 61, a bus scrambler unit 62, a random-number-generating unit 63, an encryption/decryption unit 64, a memory 65 and a CPU 66.

The SAM 8 is a tamper-withstanding module.

The ASPS communication interface unit 60 is an interface for exchanging data with the ASP server 19 shown in FIG. 1.

The external-memory communication interface unit 61 is an interface for exchanging data with the external memory 7.

The bus scrambler unit 62 scrambles output data and descrambles input data in an operation to exchange the data through the external-memory communication interface unit 61.

The random-number-generating unit 63 generates a random number used in authentication.

The encryption/decryption unit 64 encrypts data and decrypts encrypted data.

The memory 65 is used for storing tasks and programs, which are executed by the CPU 66, and data used in the execution of the tasks and the programs as will be described later.

The CPU 66 executes tasks such as a script download task, a script interpretation task, an entity generation task (a job management data creation task) and an IC-card procedure management task (a job management data management task). These tasks will be described later.

The CPU 66 also executes management of versions of application elements APE as well as management of the general user storage area, the user common storage area and the privileged-user storage area.

In addition, the CPU 66 carries out processing specified in the SAM unit 9 on the basis of an operation command in the SAM unit 9, and controls processing of the IC module 3*a* employed in the IC card 3 and the IC module 42 employed in the portable communication apparatus 41 on the basis of operation commands of the IC module 3a and the IC module 42.

The following description explains the tasks, the programs and the data, which are stored in the memory 65.

Figure 22:
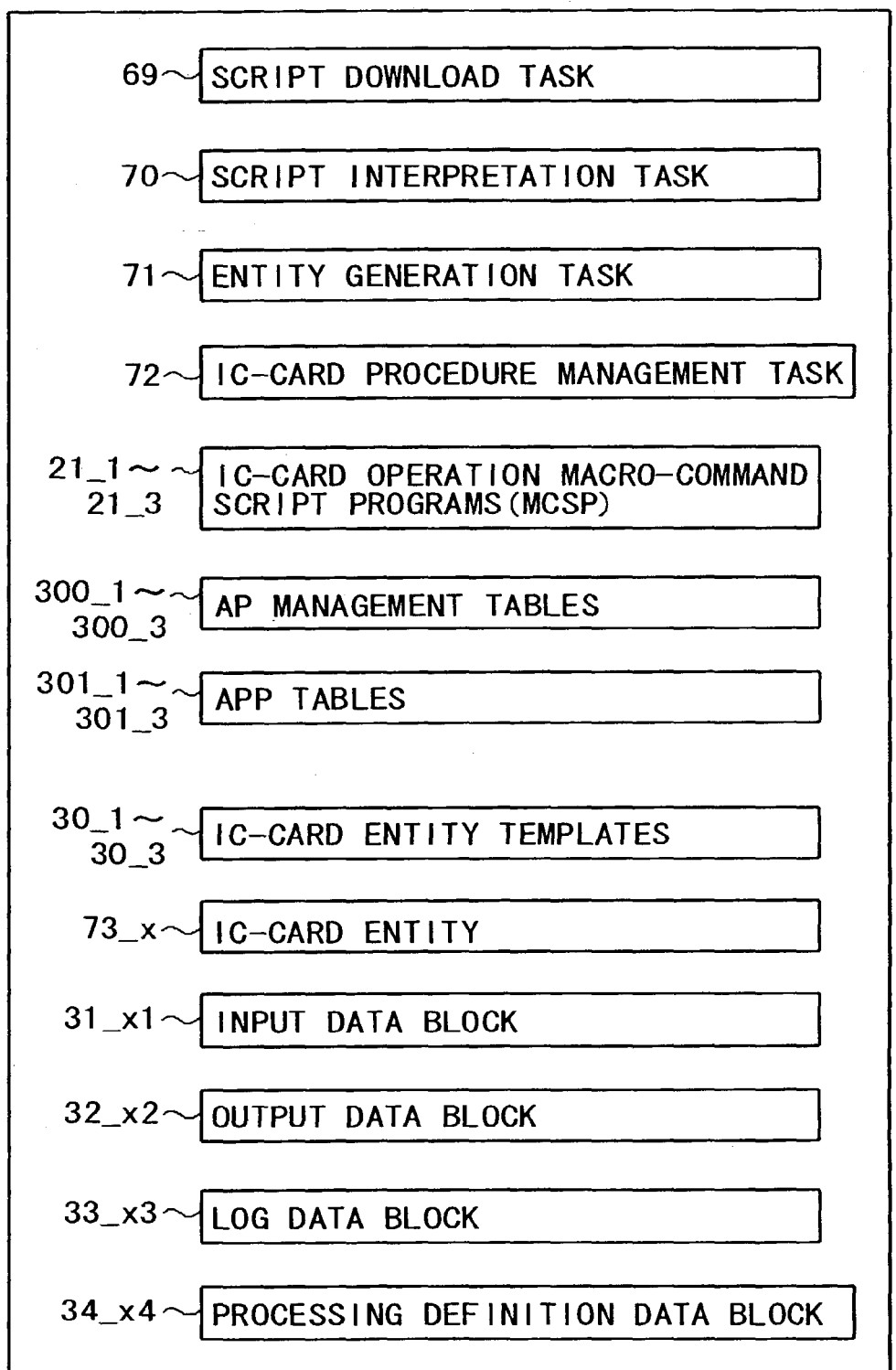
FIG. 22 is an explanatory diagram showing tasks, programs and the data, which are stored in a memory employed in the SAM shown in FIG. 21.

FIG. 22 is an explanatory diagram showing the tasks, the programs and the data, which are stored in the memory 65. As shown in FIG. 22, the memory 65 is used for storing the aforementioned script download task 69, the aforementioned script interpretation task 70, the aforementioned entity generation task 71, the aforementioned IC-card procedure management task 72, IC-card operation macro-command script programs 21_1 to 21_3, the AP management tables 300_1 to 300_3, the APP tables 301_1 to 301_3, IC-card entity templates 30_1 to 30_3, an IC-card entity 73_x, an input data block 31_x1, an output data block 32_x2, a log data block 33_x3 and a processing definition data block 34_x4.

As shown in FIG. 13, the script download task 69 downloads the AP management tables 300_1 to 300_3 and, if necessary, the APP tables 301_1 to 301_3 from typically a computer owned by each service-rendering enterprise into the SAM 8.

The script interpretation task 70 generates an IC-card entity 73_x, an input data block 31_x1, an output data block 32_x2, a log data block 33_x3 and a processing definition data block 34_x4 for each service-rendering enterprise by using service definition tables, and if necessary, the APP tables 301_1 to 301_3.

The number of data blocks generated for each service-rendering enterprise is not specially determined.

When receiving a request for creation of an entity from typically the ASP server 19, the entity generation task 71 conducts polling with the IC card 3, and then, by using an IC card entity template for a service-rendering enterprise, generates an IC card entity to be used in procedural processing between the IC card 3 and the service-rendering enterprise. At this time, the IC card entity template becomes a class, and the IC card entity is generated as a class instance.

Processing carried out by the entity generation task 71 to generate an IC card entity will be described in detail later.

The IC-card procedure management task 72 carries out the procedural processing between the IC card 3 and the service-rendering enterprises 15_1 to 15_3 by using an IC card entity 73_x or a plurality of IC card entities 73_x existing in the memory 65. In this embodiment, a plurality of procedural processes between a plurality of IC cards 3 and the service-rendering enterprises 15_1 to 15_3 are carried out at the same time. That is to say, the IC-card procedure management task 72 carries out these procedural processes concurrently. The IC-card procedure management task 72 deletes IC card entities 73_x already used in such processes. Processing carried by the IC-card procedure management task 72 will be described later in detail.

The IC-card operation macro-command script programs 21_1 to 21_3 are obtained by the script download task 69 from typically the external memory 7 and stored in the memory 65.

By the same token, the AP management tables 300_1 to 300_3 are obtained by the script download task 69 from typically the external memory 7 and stored in the memory 65.

In the same way, the APP tables 301_1 to 301_3 are obtained by the script download task 69 from typically the external memory 7 and stored in the memory 65.

The IC card entity templates 30_1 to 30_3 are generated by the script interpretation task 70 and will each be used as a template (class) for generating an IC card entity 73_x of a procedure for a service-rendering enterprise. By using the IC card entity templates 30_1 to 30_3 as typically classes, the entity generation task 71 generates an IC card entity 73_x as a class instance.

As described earlier, the script interpretation task 70 generates an input data block 31_x1, an output data block 32_x2, a log data block 33_x3 and a processing definition data block 34_x4.

Next, the IC card entity 73_x is explained.

When the SAM 8 receives a request for processing using the IC card 3 and the application program of a predetermined service-rendering enterprise from the ASP server 19 for example, the entity generation task 71 in the SAM 8 generates an IC card entity 73_x by using an already generated IC card entity template of the service-rendering enterprise.

FIG. 23 is an explanatory diagram showing the format of the IC card entity 73_x. As shown in FIG. 23, the IC card entity 73_x comprises a management pointer 80, an entity ID 81, entity status 82, an IC card type 83, an APE_N specification 84, a processing order 85, pre-processing data 86 and post-processing data 87.

The management pointer 80 is a bi-directional pointer for managing the IC card entity 73_x in the memory 65. The entity ID 81 is used in a series of processes involving the IC card entity. 73_x. Examples of the processes are a request for creation of an IC card entity 73_x, verification of progress of the creation of the IC card entity 73_x and deletion of the IC card entity 73_x. The entity ID 81 is passed to the end user as a return value. The entity ID 81 corresponds to a descriptor used in an operation to open a file by using a file system.

Figure 24:
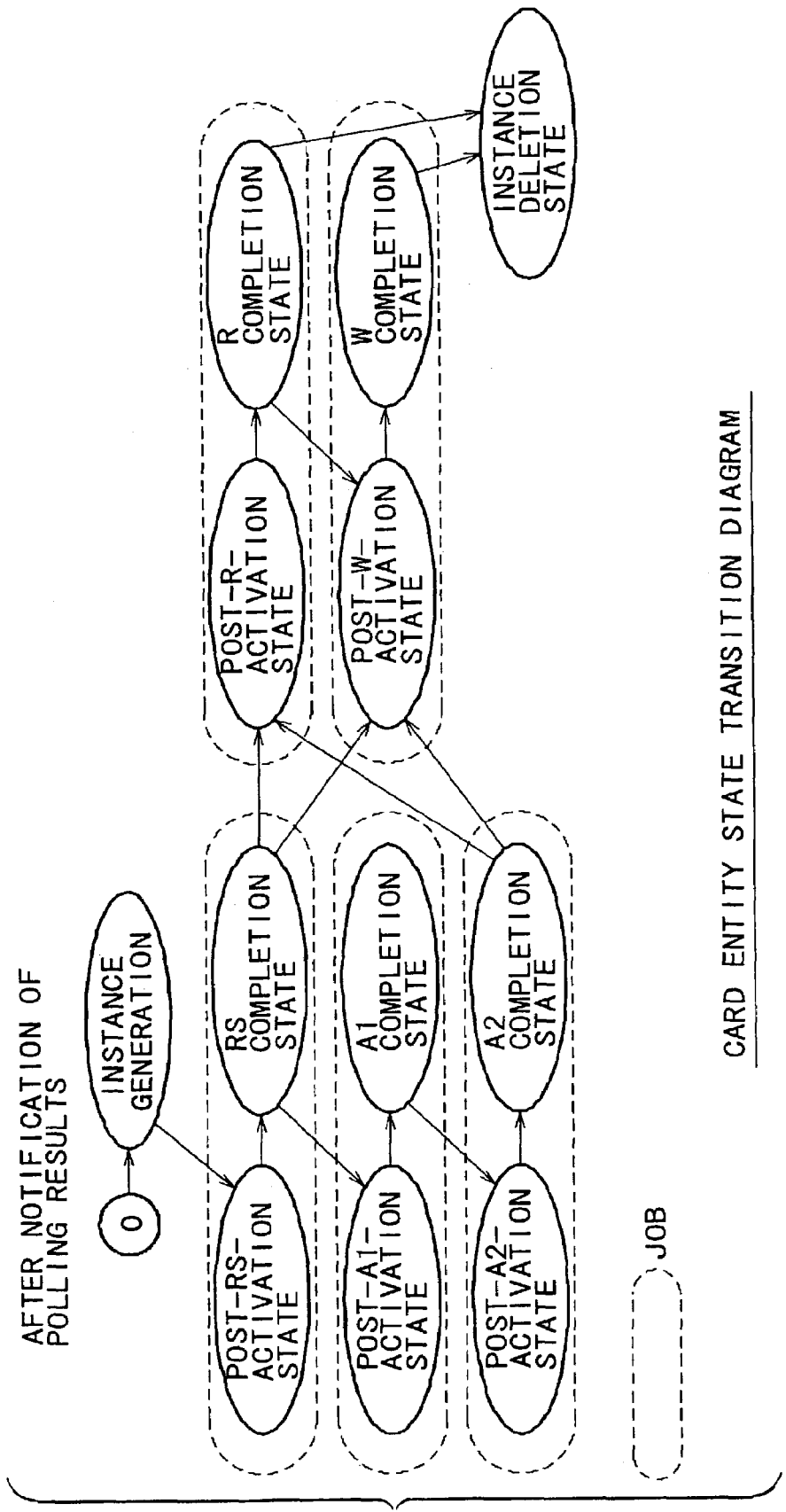
FIG. 24 is an explanatory diagram showing state transitions of entity status included in the format shown in FIG. 23.

The entity status 82 is status of progress of a procedure related to the IC card 3. As shown in FIG. 24, basic status of the IC card entity 73_x includes processing status RS, processing status A1, processing status A2, processing status R and processing status W. The processing status RS is status of processing to examine services that can-be used by the IC card 3. The processing status A1 is status of processing carried out by the SAM 8 to authenticate the IC card 3. The processing status A2 is status of processing carried out by the IC card 3 to authenticate the SAM 8. The processing status R is status of processing to read out data from the IC card 3. The processing status W is status of processing to write data into the IC card 3.

This embodiment carries out processing to examine service-rendering enterprises, processing carried out by the SAM 8 to authenticate the IC card 3, processing carried out by the IC card 3 to authenticate the SAM 8, processing to read out data from the IC card 3 and processing to write data into the IC card 3 each as a job.

As will be described later, a job is a processing unit, the processing order of which is determined by the IC-card procedure management task 72.

It is to be noted that status of the mutual authentication between the IC card 3 and the SAM 8 is represented by the A1 and A2 status.

In addition, in this embodiment, taking times of communication through the Internet 10 into consideration, the basic status described above is managed by dividing each of the basic status into a post-activation state (or a post-command state) and a completion state (or a post-response-reception state) as shown in a state-transition diagram of FIG. 24. To put it concretely, the states of processing using the IC card entity 73_x are managed by using an instance generation state (an IC card entity generation state), a post-RS-activation state, an RS completion state, a post-A1-activation state, an A1 completion state, a post-A2-activation state, an A2 completion state, a post-R-activation state, an R completion state, a post-W-activation state, a W completion state and an instance deletion state (an IC card entity deletion state).

The IC card type 83 is data for identifying a service-rendering enterprise issuing the IC card 3. The IC card type 83 includes data set therein. The data is prescribed by a CI command in the script command described above at the time the IC card entity 73_x is created.

The service type element 84 indicates an application element APE defined in the AP management tables 300_1 to 300_3 and the APP tables 301_1 to 301_3 utilized in processing using the IC card entity 73_x. In the service type element 84, there are set an application element APE or a plurality of application elements APE specified by a CS command in the script program described above at the time the IC card entity 73_x is generated.

The processing order 85 is an order in which services (that is, jobs) utilized in processing using the IC card entity 73_x are to be executed. That is to say, the processing order 85 is the transition state shown in FIG. 24. In other words, the processing order 85 is an order of execution of jobs expressed in terms of names APE_N of application elements APE for basic operations of the IC card 3.

The jobs correspond to the RS, A1, A2, R and W jobs, which are shown in FIG. 24. Actual operations are carried out on the IC card 3 in the processing order expressed in terms of jobs. For example, for processing only to read out data from the IC card 3 without mutual authentication, "RS' R" is set in the processing order 85. In the case of processing to read out and write data from and into the IC card 3 with mutual authentication, "RS' A1' A2' R' W" is set in the processing order 85. Thus, the processing order 85 is a job order corresponding to an order of service elements specified in commands of a script program described earlier in creation of an IC card entity 73_x.

In the pre-processing data 86, from the ASP 19, management data for carrying out processing using IC card entity 73_x is set. For example, in the pre-processing data 86, a processing-equation point of a service (or an application element APE) specified in an SF data block is set.

In addition, if no inter-service processing function is defined, in the pre-processing data 86, a fee of requested processing is set. In the case of a settlement for example, states indicating a fee and the number of appended points are set.

The post-processing data 87, which is data required in the ASP server 19, is a result of processing carried out on the IC card entity 73_x. In the case of a settlement for example, the post-processing 87 is set for data indicating whether or not the settlement has been ended normally.

Next, a typical operation carried out by the communication system 1 is explained. If an application element APE used in processing of the operation has a plurality of versions, the processing is carried out on the basis of a specified version by execution of the version management function explained earlier by referring to FIGS. 9 to 12.

Figure 25:
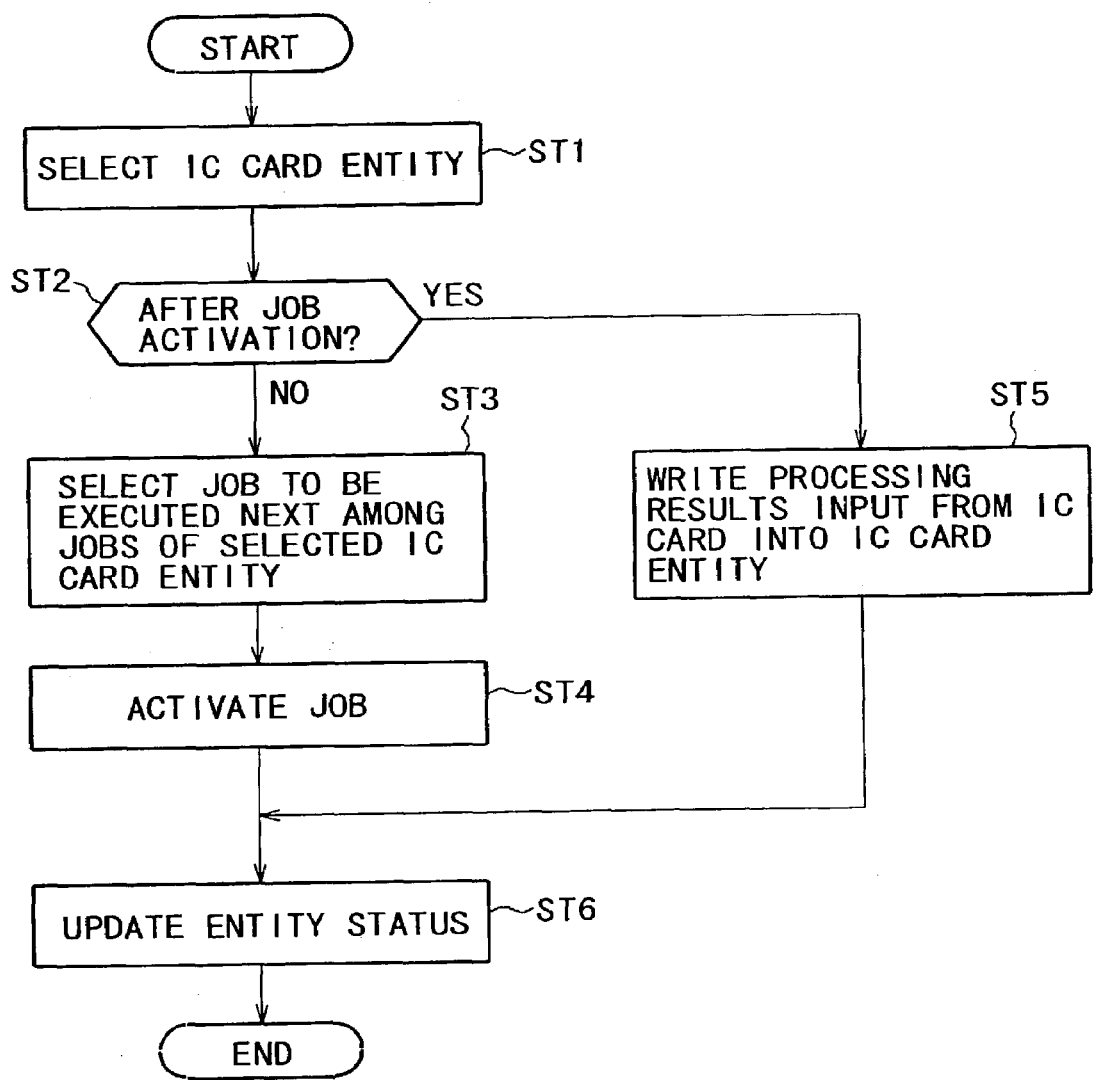
FIG. 25 shows a flowchart representing processing carried out by an IC card procedure management task.

The following description explains a procedure of processes related to a plurality of IC cards 3. The procedure is executed by the IC card procedure management task 72 shown in FIG. 22 by using a plurality of IC card entities 73_x. The IC card procedure management task 72 is running all the time typically on the CPU 66 employed in the SAM 8 shown in FIG. 21. FIG. 25 shows a flowchart representing processing carried out by IC card procedure management task 72.

Step ST1:

The IC card procedure management task 72 selects one of a plurality of IC card entities 73_x existing in the memory 65. Processing related to the selected IC card entity 73_x is to be carried out next. As a method of selecting an IC card entity 73_x, an IC card entity 73_x is selected according to an order the IC card entities 73_x arranged in the memory 65. As an alternative, a priority level is assigned to each of the IC card entities 73_x and an IC card entity 73_x is selected on a priority basis.

Step ST2:

The IC card procedure management task 72 forms a judgment as to whether or not the job of the IC card entity 73_x selected at the step ST1 has already been activated. If the outcome of the judgment indicates that the job of the IC card entity 73_x selected at the step ST1 has already been activated, the procedure goes on to processing of a step ST5. If the outcome of the judgment indicates that the job of the IC card entity 73_x selected at the step ST1 has not been activated, on the other hand, the procedure goes on to processing of a step ST3.

Step ST3:

The IC card procedure management task 72 identifies a state of processing related to the IC card entity 73_x selected at the step ST1 among states shown in the state transition diagram shown in FIG. 24 from the entity status 82 shown in FIG. 23, and determines a job to be carried out next from the processing order 85. As described earlier, the processing order 85 prescribes an execution sequence of jobs expressed in terms of service elements set in the AP management tables 300_1 to 300_3.

Step ST4:

The IC card procedure management task 72 activates the job selected at the step ST3. Then, the IC card procedure management task 72, carries out the job by using a data block related to this job. The data block related to this job is selected among the input data block 31_x1, the output data block 32_x2, the log data block 33_x3 and the processing definition data block 34_x4, which have been explained earlier by referring to FIG. 13.

At that time, if a command is issued to the IC card 3 in execution of the job, the IC card procedure management task 72 searches the AP management tables 300_1 to 300_3 by using a service element for the job as a key for a service number of the service element. The service number is an operation command, which is issued to the IC card 3 and can be interpreted by the IC card 3. Then, the IC card procedure management task 72 issues the command by using the service number to the IC card 3. In addition, if a key is required in making an access to the storage area of the IC module 3a of the IC card 3, the IC card procedure management task 72 searches the AP management tables 300_1 to 300_3 by using a service element for the job as a key for a service number assigned to the service element. Then, the IC card procedure management task 72 carries out processing by using the key in order to acquire a right to make an access to the storage area of the IC card 3. The processing includes mutual authentication with respect to the IC card 3, encryption of data and decryption of data.

Step ST5:

The IC card procedure management task 72 issues a command to the IC card 3. Then, at a step ST5, the IC card procedure management task 72 waits for a result of processing carried out by the IC card 3 to process the command. As the IC card procedure management task 72 receives the result of processing from the IC card 3, the IC card procedure management task 72 sets the result in the IC card entity 73_x.

Step ST6:

The IC card procedure management task 72 updates the entity status 82 of the IC card entity 73_x. The entity status 82 of the IC card entity 73_x is shown in FIG. 23.

As described above, in this embodiment, while selecting IC card entities 73_x of a plurality of IC cards 3 existing in the SAM 8 sequentially one after another in accordance with a predetermined order, the IC card procedure management task 72 carries out processing on the IC cards concurrently. Thus, even when a processing request for a procedure using a plurality of IC cards 3 is received, the SAM 8 is capable of carrying forward the processing at the same time.

Figure 26:
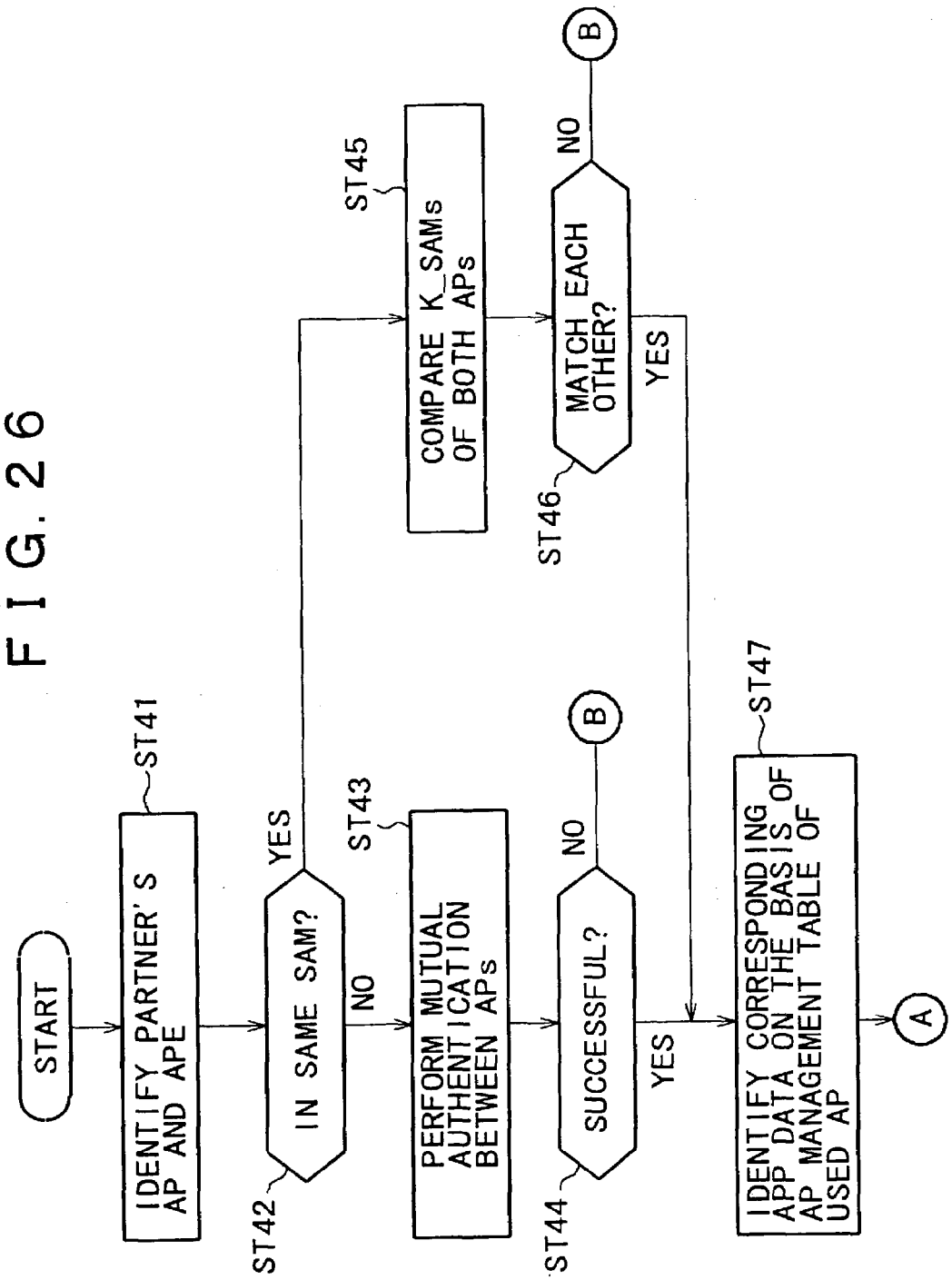
FIG. 26 shows a flowchart used for explaining processing carried out by the SAM in accordance with a procedure prescribed by an application element APE to make an access to data, or processing prescribed by another application element APE to be carried out by the SAM in accordance with the procedure in execution of a job at-the flowchart shown in FIG. 25.
Figure 27:
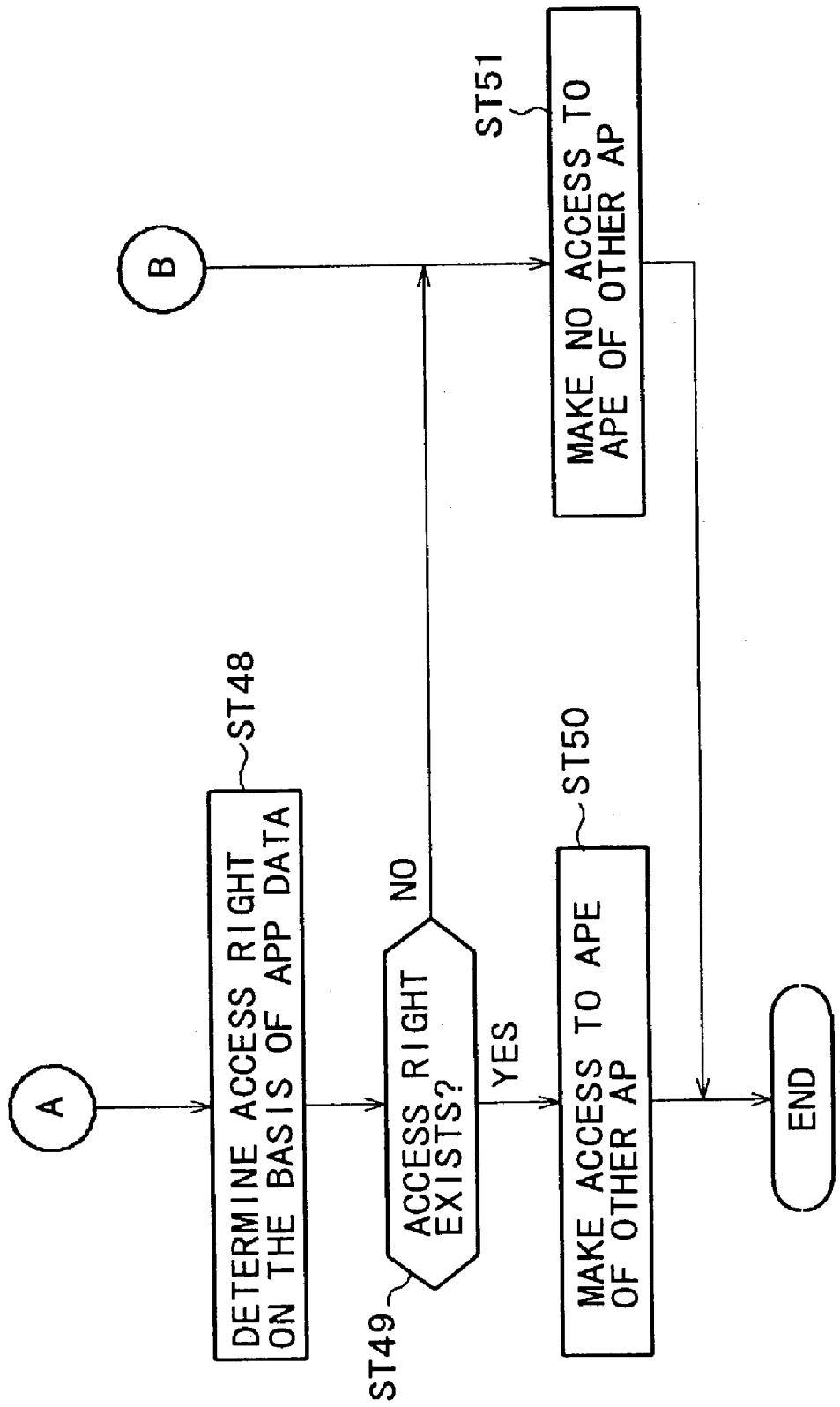
FIG. 27 shows a continuation of the above flowchart used for explaining processing carried out by the SAM in accordance with a procedure prescribed by an application element APE to make an access to data, or processing prescribed by another application element APE to be carried out by the SAM in accordance with the procedure in execution of a job at the flowchart shown in FIG. 25.

FIGS. 26 and 27 show a flowchart used for explaining processing carried out by the SAM 8 in accordance with a procedure prescribed by an application element APE to make an access to data, or processing prescribed by another application element APE to be carried out by the SAM 8 in accordance with the procedure in execution of a job at the step ST4 in FIG. 25.

Step ST41:

In the course of execution of processing according to a predetermined application element APE, the SAM 8 identifies an application program AP making an access and an application element APE in the application program. In addition, the SAM 8 also forms a judgment as to whether the access is an operation to read out or write the application element APE or execution of the application element APE.

Step ST42:

The SAM 8 forms a judgment as to whether or not the application element APE identified at the step ST41 exists in the same SAM 8. If the outcome of the judgment indicates that the application element APE identified at the step ST41 does not exist in the same SAM 8, the flow of the processing goes on to a step ST43. If the outcome of the judgment indicates that the application element APE identified at the step ST41 exists in the same SAM 8, on the other hand, the flow of the processing goes on to a step ST45.

Step ST43:

The SAM 8 searches the AP management tables 300_1 to 300_3 associated with the application program being executed for a key K_SAM for the corresponding service (the application element APE) and conducts mutual authentication with respect to a SAM 8a having the application element APE by using the key K_SAM.

Step ST44:

If the result of the mutual authentication carried out at the step ST43 indicates validity of both the SAMs 8 and 8a, the flow of the processing carried out by the SAM 8 goes on to a step ST47. Otherwise, the flow of the processing goes on to a step ST51.

Step ST45:

The SAM 8 searches the AP management tables 300_1 to 300_3 associated with the application program being executed for a key K_SAM for the corresponding service (the application element APE). In addition, the SAM 8 also searches the AP management tables 300_1 to 300_3 associated with the application element APE identified at the step ST41 for a key K_SAM for the corresponding service (the application element APE). Then, the SAM 8 compares the 2 keys K_SAM with each other.

Step ST46:

The SAM 8 forms a judgment as to whether or not the 2 keys K_SAM match each other as a result of the comparison carried out at the step ST45. If the outcome of the judgment indicates that the 2 keys K_SAM match each other, the flow of the processing carried out by the SAM 8 goes on to a step ST47. Otherwise, the flow of the processing goes on to the step ST51.

Step ST47:

The SAM 8 or 8a searches the AP management tables 300_1 to 300_3 associated with the application program identified at the step ST41 for respectively APP tables 301_1 to 301_3 associated with the used application element APE.

Step ST48:

The SAM 8 or 8a forms a judgment on a right to make an access to the application element APE to be used or accessed on the basis of the APP tables 301_1 to 301_3 identified at the step ST47. To put it concretely, the SAM 8 or 8a forms a judgment on existence of a right to read out or write data from or into the application element APE or an access to execute the application element APE.

Step ST49:

If the result of the judgment formed at the step ST48 indicates existence of the access right, the flow of the processing carried out by the SAM 8 or 8a goes on to a step ST50. Otherwise, the flow of the processing goes on to the step ST51.

Step ST50:

The SAM 8 and 8a executes the application program AP identified at the step ST41 on the application element APE also identified at the step ST41.

Step ST51:

The SAM 8 and 8a does not execute the application program AP identified at the step ST41 on the application element APE also identified at the step ST41.

In addition, when data is exchanged between the SAM 8 and the IC card 3 in accordance with a procedure set by an application element APE in the execution of a job at the step ST4 of the flowchart shown in FIG. 25, the SAM 8 searches the AP management tables 300_1 to 300_3 shown in FIG. 17 for a key K_CADR for the application element APE and uses a key K_CARD to make an access to the memory 50 of the IC card 3.

Figure 28:
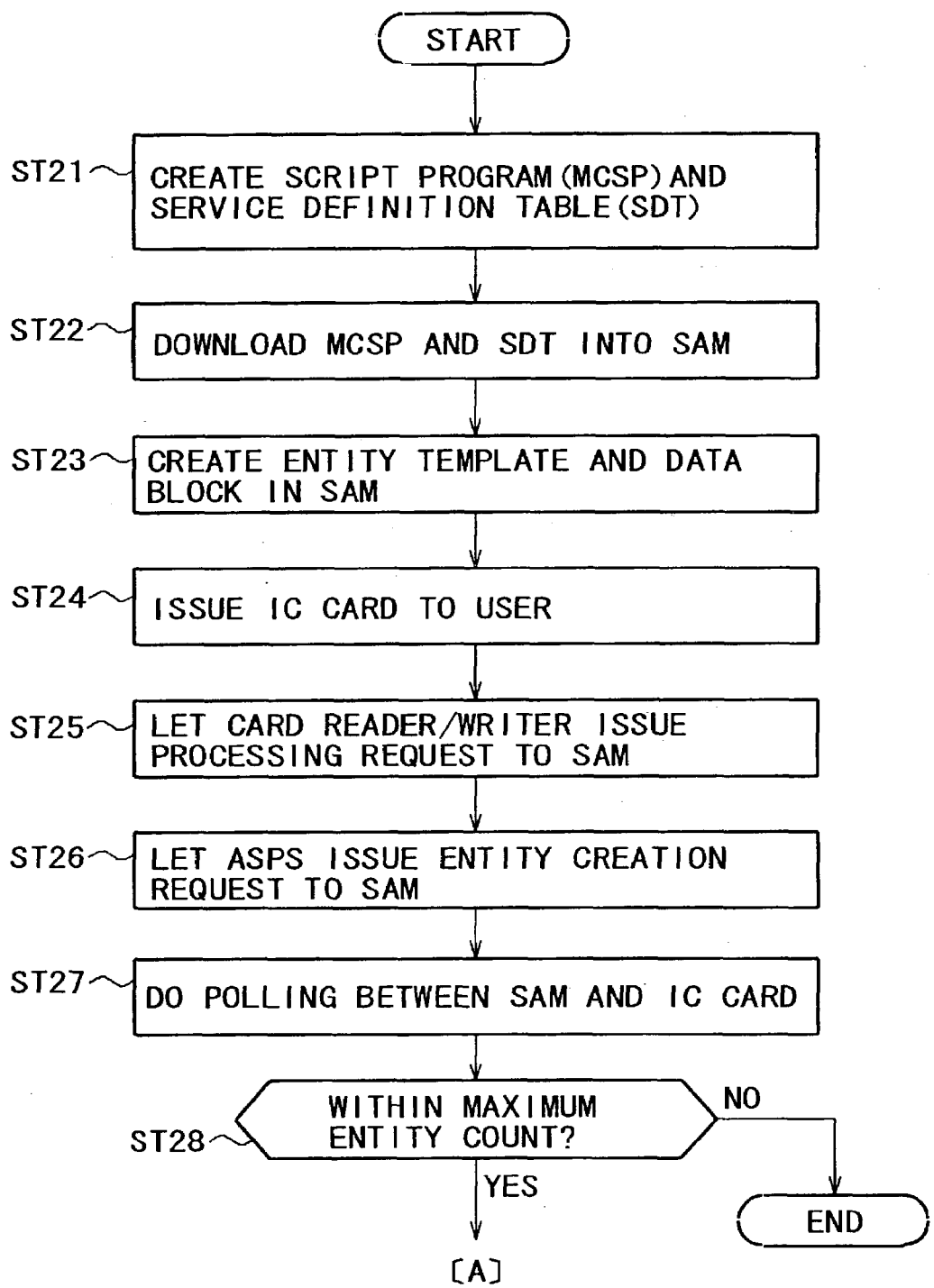
FIG. 28 shows a flowchart used for explaining the overall operation of the communication system shown in FIG. 1.
Figure 29:
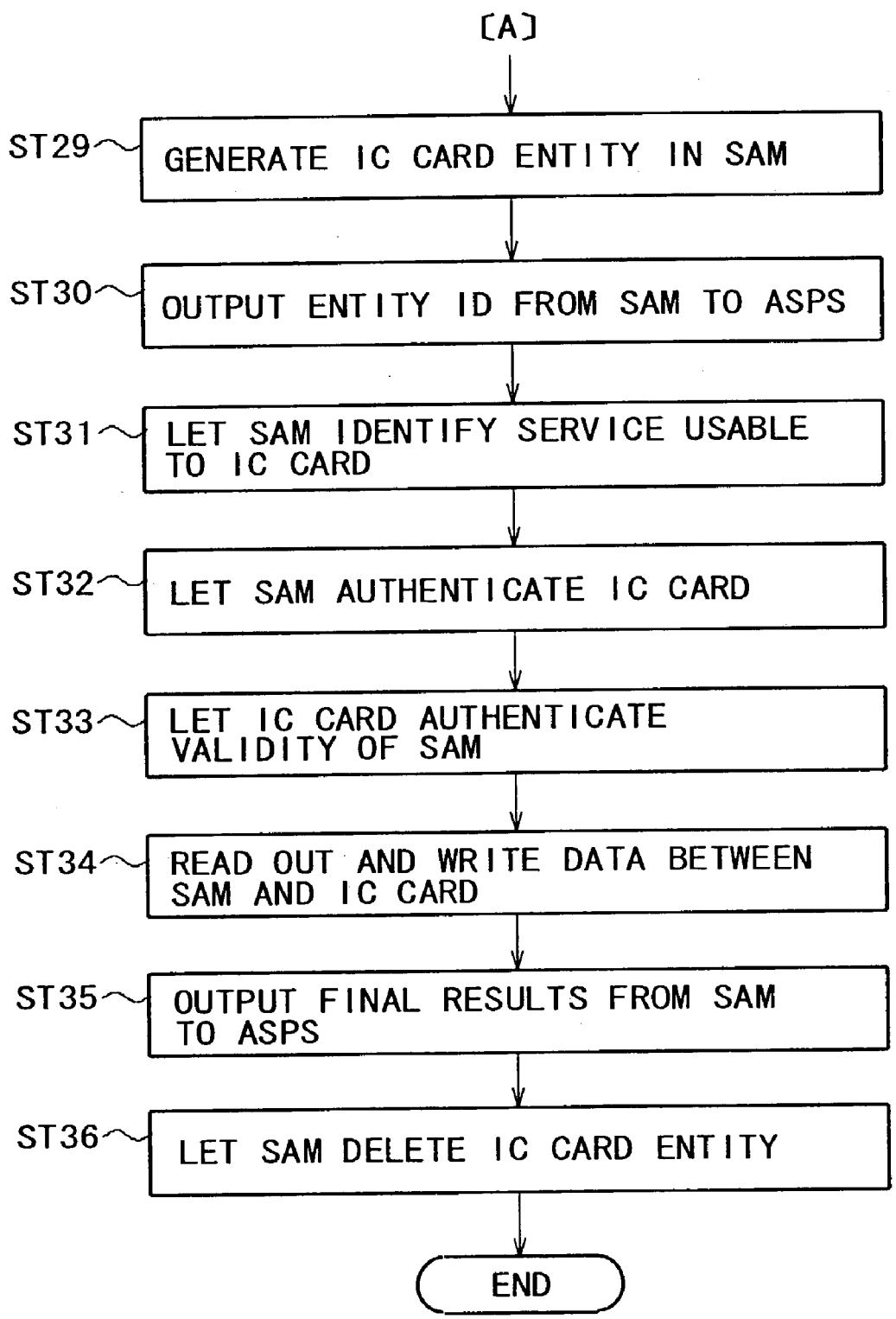
FIG. 29 shows a continuation of the above flowchart used for explaining the overall operation of the communication system shown in FIG. 1.

Next, the overall operation of the communication system 1 shown in FIG. 1 is explained. FIGS. 28 and 29 show a flowchart used for explaining the overall operation of the communication system 1 shown in FIG. 1.

Step ST21:

The service-rendering enterprise 15_1 to 15_3 or a person receiving a request from the service-rendering enterprise 15_1 to 15_3 create script programs 21_1, 21_2 and 21_3 prescribing transactions using the IC card 3 on typically the personal computers 16_1, 16_2 and 16_3 shown in FIG. 1. In addition, the person in charge of management of the SAM 8 creates AP management tables 300_1 to 300_3 for the service-rendering enterprise 15_1 to 15_3 respectively.

Step ST22:

The AP management tables 300_1 to 300_3 created at the step ST21 are stored in the memory 7. In addition, the script programs 21_1, 21_2 and 21_3 created at the step ST21 are downloaded from the personal computers 16_1, 16_2 and 16_3 to the external memory 7 by way of the Internet 10, the ASP server 19 and the SAM 8. As shown in FIG. 13, processing to download the script programs 21_1, 21_2 and 21_3 created at the step ST21 is controlled by the script download task 69 of the SAM 8.

Step ST23:

As shown in FIG. 13, the script interpretation task 70 of the SAM 8 generates the IC card entity 73_x, input data block 31_x1, output data block 32_x2, log data block 33_x3 and processing definition data block 34_x4 by using the AP management tables 300_1 to 300_3 and script programs for each service-rendering enterprise. These data blocks are stored in the memory 65 of the SAM 8 shown in FIG. 21.

Step ST24:

An IC card 3 is issued to the user. The IC module 3a employed in the IC card 3 shown in FIG. 5 is used for storing a key used in transactions with a service-rendering enterprise with which the user has made a contract. It is to be noted that a contract can also be made between the user and a service-rendering enterprise through typically the Internet 10 after issuance of the IC card 3.

Step ST25:

Assume for example that the user uses the personal computer 5 to make an access to the server 2 through the Internet 10 in order to purchase a product. In this case, the server 2 issues a processing request to the ASP server 19 by way of the Internet 10. When receiving the processing request from the server 2, the ASP server 19 makes an access to the personal computer 5 through the Internet 10. The requested processing is processing using the IC card 3. The request for processing is originated from the card reader/writer 4 and transmitted to the SAM 8 by way of the personal computer 5, the Internet 10 and the ASP server 19.

Step ST26:

A request for creation of an entity is output from the ASP server 19 to the SAM 8. The request for creation of an entity includes data indicating the issuer of the request, namely, the IC card 3.

Step ST27:

When receiving the request for creation of an entity, the SAM 8 conducts polling with the IC card 3.

Step ST28:

The entity generation task 71 of the SAM 8 forms a judgment as to whether or not the number of IC card entities 73_x existing in the SAM 8 after the polling does not exceed a maximum value prescribed by an SC command of the script program. If the number of IC card entities 73_x does not exceed the maximum value, the flow of the processing goes on to a step ST29. Otherwise, the operation is ended.

Step ST29:

The entity generation task 71 identifies a service-rendering enterprise, the IC card entity template of which is to be used, on the basis of data indicating the IC card 3 as the issuer of the request for creation of an entity. Such data is included in the request for creation of an entity. Then, the entity generation task 71 generates an IC card entity 73_x by using the IC card entity template of the identified service-rendering enterprise. This process corresponds to the instance generation shown in FIG. 24.

Step ST30:

The SAM 8 outputs the entity ID of the IC card entity 73_x generated at the step ST29 to the ASP server 19.

Step ST31:

The IC card procedure management task 72 of the SAM 8 examines services that can be used by using the IC card 3. This examination corresponds to the job RS shown in FIG. 24.

Step ST32:

The IC card procedure management task 72 of the SAM 8 authenticates the validity of the IC card 3. This authentication corresponds to the job A1 shown in FIG. 24.

Step ST33:

The IC card 3 authenticates the validity of the SAM 8. This authentication corresponds to the job A2 shown in FIG. 24. The authentications carried out at the steps ST32 and ST33 are referred to as mutual authentication between the IC card 3 and the SAM 8. As described earlier, during the mutual authentication, in accordance with an application element APE executed in the SAM 8, the AP management tables 300_1 to 300_3 shown in FIG. 15 are searched for a key K_CARD to be used in the mutual authentication between the CPU 51 employed in the IC card 3 and the SAM 8.

Step ST34:

The IC card procedure management task 72 of the SAM 8 writes and reads out data necessary for the procedure into and from the IC card 3. These read and write operations correspond to the jobs R and W, which are shown in FIG. 24. In addition, the IC card procedure management task 72 also carries out predetermined processing on data read out from the IC card 3, by using a processing equation identified on the basis of the pre-processing data 86 of the IC card entity 73_x.

Step ST35:

The IC card procedure management task 72 of the SAM 8 outputs a result of the processing carried out at the step ST34 to the ASP server 19.

Step ST36:

Typically, the IC card procedure management task 72 deletes the IC card entity 73_x.

As described above, in accordance with the communication system 1 and the SAM unit 9, by introducing the concept of versions into the application element APE, it becomes possible to manage versions of the card operation key and the issuance key package. Thus, it is no longer necessary for the service-rendering enterprise using the SAM 8 to carry out the work to individually define APE_ID of a key as an AP resource for each version. As a result, the management load becomes smaller. For example, it is possible to imagine a case in which packages for logically dividing a card are exchanged between different SAMs 8.

In addition, in accordance with the communication system 1 and the SAM unit 9, by introducing the concept of tags into application elements APE, it becomes possible to refer to an application element APE to which version management is not applied. If APE_ID and APE_TAG are defined in an application program, for example, the service-rendering enterprise is capable of referring to the application element APE by using the tag. Thus, there is exhibited an expectable effect of a lowered threshold for a service-rendering enterprise not well versed on application programs and/or access methods. Furthermore, a key package for logically dividing a card does not include all information for uniquely identifying post-division information. Thus, in order to identify division information including a key package between SAMs 8, reflection of information agreed on by service-rendering enterprises in a log becomes an indispensable operation.

Moreover, in accordance with the communication system 1 and the SAM unit 9, by combining AP_ID with APP_ID, the storage area can be divided into a system area, a privileged-user area and a general-user area. In addition, it is also possible to provide a mechanism allowing a work of setting a device number to be carried out at a shipping time of an encrypted module, a work to be carried out by a primary-operation operator (a privileged user) to set information such as the ID of an encrypted module, a work to be carried out by a secondary-operation operator (a general user) to set typically a service using an unimplemented card and management according to a responsibility domain of the operator to be executed. Thus, the encrypted module is capable of carrying out an operation by on the assumption that a plurality of users are placed at hierarchical levels.

In addition, in accordance with the communication system 1 and the SAM unit 9, by dividing the general-user area into an ordinary area and a user-unique area, it becomes possible to manage data common to encrypted modules in a way uniform to all enterprises pertaining to all AP resources. An example of the common data is network-setting information. Thus, each individual user is capable of managing common items related to the encrypted module. Furthermore, since an AP resource key set in the common area can also be used as a user-unique key, key management of the service-rendering enterprise can be made simple.

Moreover, in accordance with the communication system 1 and the SAM unit 9, an application program AP is constructed by using a plurality of application elements APE and processing of each application element APE is prescribed by using an AP management table and an APP table. It is thus possible to render a variety of services using the IC card 3.

Furthermore, in accordance with the communication system 1, by using an AP management table and an APP table, it is possible to flexibly realize utilization of an application element APE in the same SAM unit and utilization of an application element APE between different SAM units while sustaining a high degree of security.

In addition, in accordance with the communication system 1, if an application element APE is utilized between different SAM units, mutual authentication between the SAM units is carried out. Thus, the security of the application program can be better assured.

Moreover, in accordance with the communication system 1, SAM_ID of a common class is assigned to application programs of the same service-rendering enterprise. Thus, between application elements APE of application programs belonging to the same service-rendering enterprise, it is possible to avoid complex mutual authentication, and hence, possible to reduce the load of key management as well as the processing load borne by the SAM 8.

Figure 30:
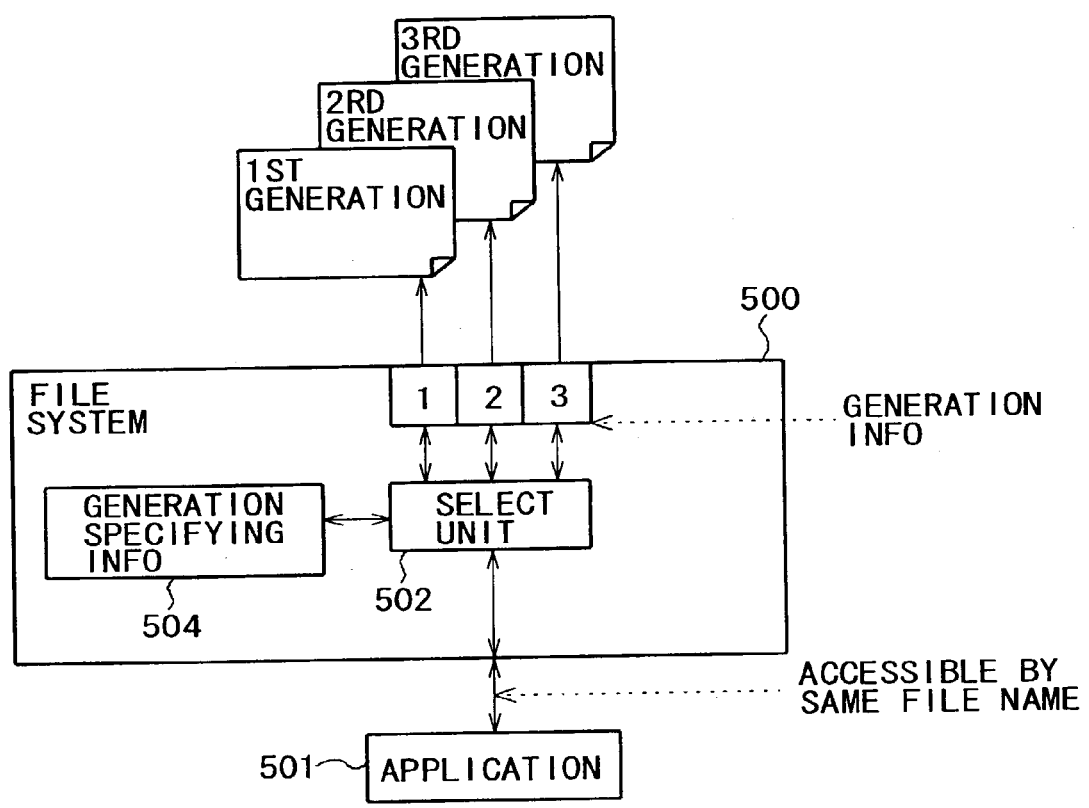
FIG. 30 is an explanatory diagram showing an outline of version management executed in the embodiment shown in FIG. 1.

By referring to FIGS. 30 to 33, the following description briefly summarizes the embodiment's portions relevant to characteristics of the present invention. As shown in FIG. 30, generation information is added to each file in a file system 500. The generation information is updated by adopting some methods. In accordance with one of the methods, the generation information has an initial value, which is thereafter incremented or decremented each time a new generation is introduced. In accordance with another one of the methods, the generation information is updated to information such as a date on which a new generation is introduced each time a new generation is introduced. As an alternative, the generation information is updated by adoption of combined methods.

An application 501 makes an access to a file by using the same file name independent of the generation. A select unit 502 selects a file of a generation for the access made by the application 501. It is necessary to specify a generation when a file name is selected. A generation can be selected for each access, or a current generation is saved to be used in each access. The generation-specifying information 504 shown in FIG. 30 is means for holding a current generation. As a technique to select a generation other than the current generation, another generation can be specified as a difference between the generation of a target file from the current generation used as a reference.

In addition, in an attempt to detect file falsification, a signature is put on each generation as shown in FIG. 31. In an operation carried out by the select unit 502 to store a file, a signature generation/authentication unit 511 generates a signature in accordance with a predetermined algorithm based on a signature key 510 and puts the signature on the file. In an operation to retrieve a file, on the other hand, the signature generation/authentication unit 511 authenticates a signature in accordance with a predetermined algorithm based on the signature key 510. If the signature is found invalid, a message indicating that the signature is invalid is given to the application 501.

The signature authentication allows file falsification to be detected. In addition, a file's missing portion caused by an abnormality of hardware can also be detected as well.

Figure 32:
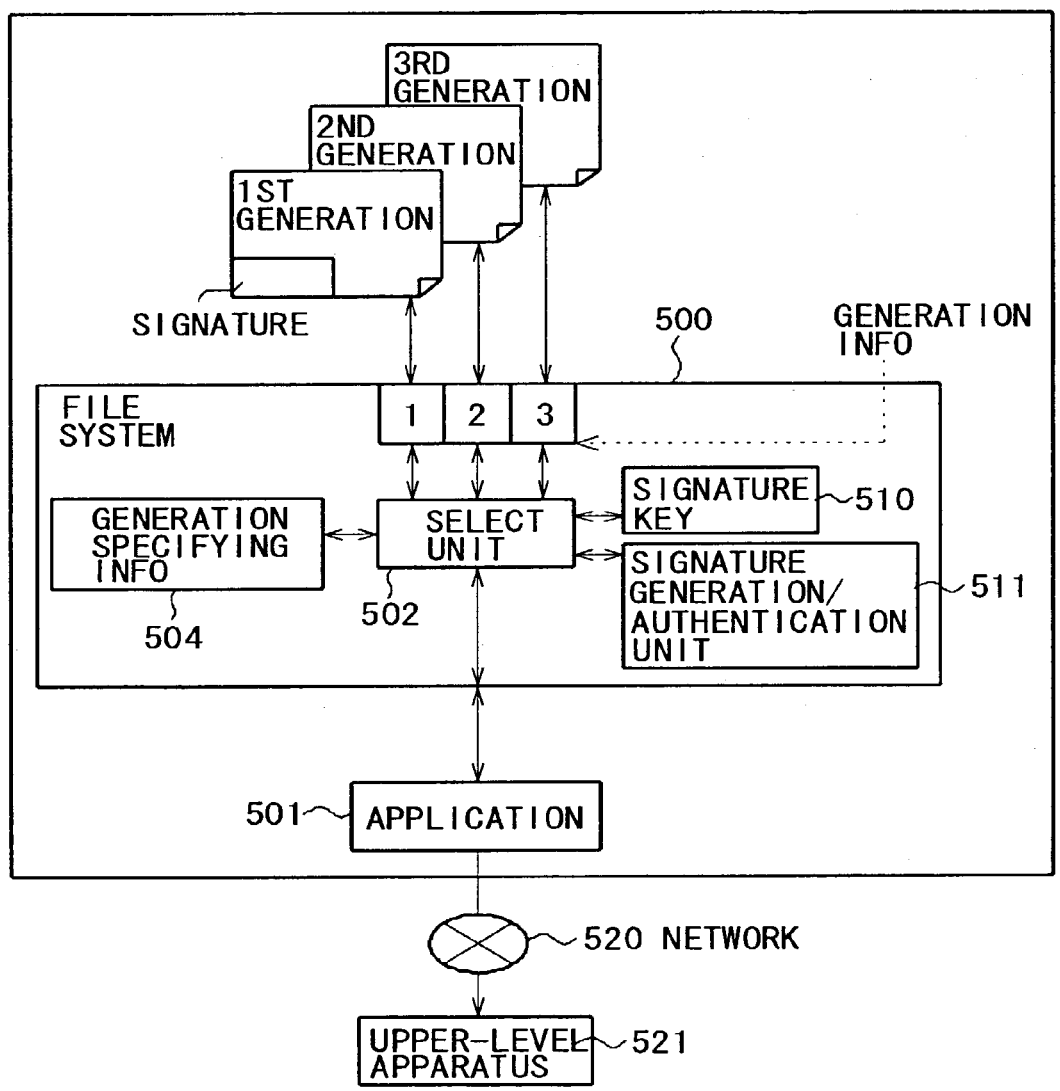
FIG. 32 is an explanatory diagram showing an outline of signature processing carried out between apparatus in the embodiment shown in FIG. 1.

FIG. 32 is a diagram showing a case in which an apparatus including the file system 500 is connected to a network 520 and an upper-level apparatus 521 makes an access to the file system 500. By adding a signature to data, the data's falsification committed in the course of a transmission through the network 520 and the data's missing portion lost during such a transmission can be detected.

Figure 33:
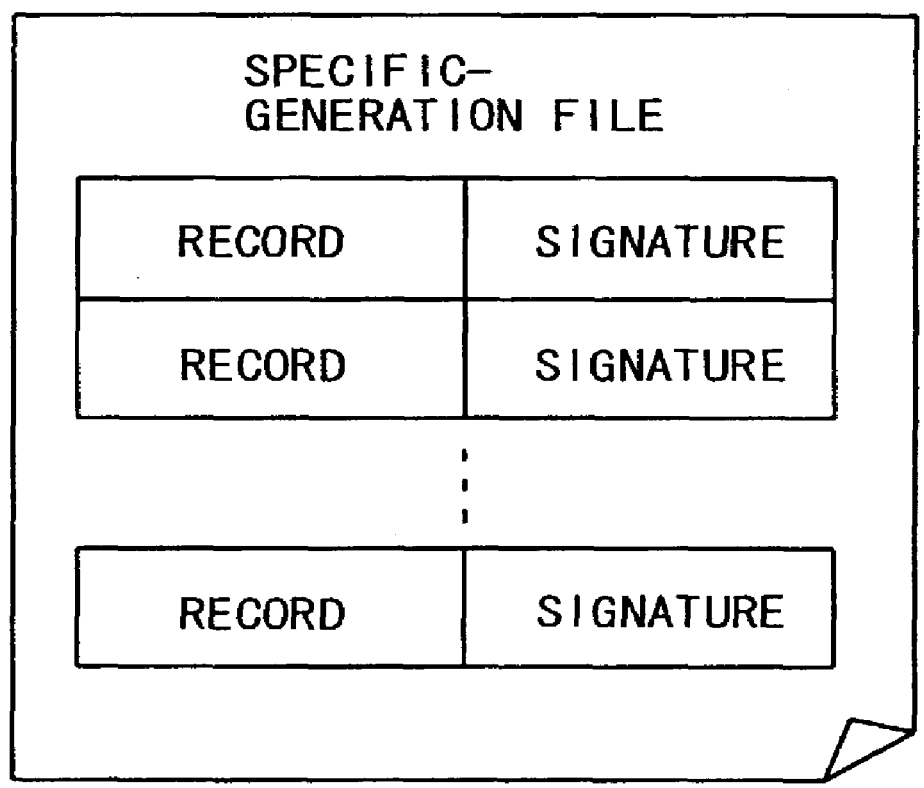
FIG. 33 is an explanatory diagram showing an outline of signature processing carried out between apparatus in the embodiment shown in FIG. 1.

As shown in FIG. 33, for example, each file comprises a plurality of records. In this case, a signature can be added to each of the records so that a signature can be authenticated for each of the records. Thus, particularly in a network environment allowing an access to a file to be made, the upper-level apparatus is capable of carrying out processing on data including a received record even in an instable condition of the network.

As described above, in accordance with the present invention, it is possible to provide a data-processing apparatus as well as a data-processing method thereof that are capable of raising the degree of security of an application program executed in a server in an operation to render a service using an integrated circuit (IC) and to provide a program implementing the data-processing method.

In addition, in accordance with the present invention, it is also possible to provide a data-processing apparatus as well as a data-processing method thereof that are capable of operating under a condition in which a plurality of data having different versions are mixed and to provide a program implementing the data-processing method.

Furthermore, in accordance with the present invention, it is also possible to provide a data-processing apparatus as well as a data-processing method thereof that are capable of properly restricting users setting application programs for security reasons and to provide a program implementing the data-processing method.

While a preferred embodiment of the present invention has been described using specific terms, such description is for illustrative purposes only, and it is to be understood that changes and variations may be made without departing from the spirit or scope of the following claims.

What is claimed is:

1. A data-processing apparatus for data processing with an integrated circuit in an IC card or a portable communication apparatus through a server to provide a service via execution of an application program, said data-processing apparatus comprising:

a memory configured to store the application program relating to the service, said application program including a plurality of first application element data necessary for execution of the application program, each of the plurality of first application element data having a version data indicating one or more versions of the first application element data, a plurality of second application element data, each of the plurality of second application element data being associated with a respective version of the first application element data, a version management file for managing a relation between the first application element data and the second application element data, and management data including an identification data of the version management file to manage a relation between the each of the plurality of first application element data and the plurality of second application element data; and a secure application module formed as a tamper withstanding package and including an operating system which executes application programs in a protected fashion such that applications are isolated from each other by an application layer firewall, the module configured to execute the application program corresponding to the plurality of first application element data in which a version of the first application element data is specified from an internal or external source of the data-processing apparatus, and the secure application module performs the execution of the application program by using the plurality of second application element data corresponding to the specified version of respective ones of the plurality of first application element data, the application program is executed using the plurality of second application element data is performed by accessing the version management file based upon the identification data included in the management data and an identification of each respective one of the plurality of the first application element data being processed, and retrieving a corresponding one of the plurality of the second application element data corresponding to the specified version by referring to the accessed version management file and an identification of each respective one of the plurality of first application element data.

2. A data-processing apparatus according to claim 1, wherein said secure application module determines one of said second application element data that is associated with a version specified by version-specifying data included in said version management file, and carries out said processing by using said determined second application element data.

3. A data-processing apparatus according to claim 1, wherein said secure application module determines one of said second application element data that is associated with a version number obtained from a value specified internal or external to said data-processing apparatus as well as from a value specified by said version-specifying data, and carries out said processing by using said second application element data.

4. A data-processing apparatus according to claim 1, wherein:

said version management data has a version identification data and said second application element data that is associated with said version identification data in record format; and said second application module identifies said version management data by referring to said management data, searches said version management data by using a specified version identification data as a key for said second application data that is associated with said specified version identification data and carries out said processing by using said second application element data.

5. A data-processing apparatus according to claim 1, wherein:

said version management data includes a table associating said version identification data with the ID of one of said second application element data that is associated with said version; and said secure application module identifies said version management data by referring to said management data, searches said table of said version management data by using the ID of a specified version as a key for the ID of said second application data that is associated with said specified version and carries out processing to obtain said second application element data by using said ID of said second application element data.

6. A data-processing apparatus according to claim 5, wherein the ID of said second application element data includes the ID of one of said first application element data that is associated with said second application element data and the ID of one of said versions that is associated with said second application element data.

7. A data-processing apparatus according to claim 5, wherein said secure application module receives a command from a source external to said data-processing apparatus, setting the ID of each of said first application element data.

8. A data-processing apparatus according to claim 5, wherein said secure application module receives a command from a source external to said data-processing apparatus, setting the ID of each of said specified versions.

9. A data-processing apparatus according to claim 5, wherein said first application element data is each a key and the ID of each of said versions is related to the ID of said key.

10. A data-processing apparatus according to claim 1, wherein:

said first application element data is each a signature key; and said secure application module identifies said version management data associated with said first application element data by referring to said management data, uses said version management data to access said second application element data that is associated with a version specified internal or external to said data-processing apparatus and uses a version signature key stored in said second application element data to carry out signature creation processing or signature authentication processing.

11. A data-processing apparatus according to claim 10, wherein said secure application module carries out signature creation processing using said signature key or signature authentication processing using said signature key in order to authenticate validity of a part or all of said first application element data.

12. A data-processing apparatus according to claim 11, wherein, when data in said first application element data includes a plurality of records, said secure application module:

generating, for each of said records, a signature based on said signature key as well as based on a predetermined encryption algorithm for a part or all of data contained in said record;

adding said signature to said record before writing said records into said memory;

generating, when reading out any specific one of said records of said first application element data from said memory, a signature based on said signature key used for writing said signature as well as based on said encryption algorithm; and comparing said generated signature with said signature added to said specific record in order to form a judgment on validity of said specific record.

13. A data-processing apparatus according to claim 1, wherein each of said first application element data includes at least one of:

history data for executed processing using said data;

program data showing a procedure for recording said data in said memory;

program data showing a procedure for deleting a record of said data from said memory; and program data showing a procedure for prescribing said storage area for storing said application program.

14. A data-processing method adopted by a data-processing apparatus for exchanging data with a predetermined integrated circuit in order to render a predetermined service in cooperation with said integrated circuit by execution of an application program comprising a plurality of first application element data, wherein said data-processing method:

preparing, when said first application element data has a plurality of versions:

a plurality of second application element data each associated with one of said versions;

a version management data for managing a relation between said first application element data and said second application element data; and management data for managing a relation between said first application element data and said version management data associated with said first application element data;

causing, when carrying out processing on said first application element data, said data-processing apparatus to refer to said management data to identify said version management data;

causing said data-processing apparatus to use said identified version management data to determine a particular one of said second application element data that is associated with one of said versions specified internal or external to said data-processing apparatus; and causing said data-processing apparatus to use said particular second application element data.

15. A data-processing method according to claim 14, wherein said version management data holds IDs of said versions and said second application element data associated with said versions in a format of records, said data-processing method further comprising:

causing said data-processing apparatus to refer to said management data to identify said version management data;

causing said data-processing apparatus to search said identified version management data by using the ID of a specified version as a key for a particular one of said second application element data that is associated with said specified version;

causing said data-processing apparatus to use said particular second application element data in processing.

16. A data-processing method according to claim 14, wherein said version management data includes a table associating the ID of each version with the ID of one of said second application element data that is associated with said version, said data-processing method further comprising:

causing said data-processing apparatus to identify said version management data by referring to said management data;

causing said data-processing apparatus to search said table of said version management data by using the ID of a specified version as a key for the ID of said second application element data that is associated with said specified version; and causing said data-processing apparatus to carry out processing to obtain said second application element data by using said ID of said second application element data.

17. A program adopted by a data-processing apparatus for exchanging data with a predetermined integrated circuit in order to render a predetermined service in cooperation with said integrated circuit by execution of an application program comprising a plurality of first application element data, wherein said program comprising:

preparing, when said first application element data has a plurality of versions:

a plurality of second application element data each associated with one of said versions;

a version management data for managing a relation between said first application element data and said second application element data; and management data for managing a relation between said first application element data and said version management data associated with said first application element data;

causing, when carrying out processing on said first application element data, said data-processing apparatus to refer to said management data to identify said version management data;

causing said data-processing apparatus to use said identified version management data to determine a particular one of said second application element data that is associated with one of said versions specified internal or external to said data-processing apparatus; and causing said data-processing apparatus to use said particular second application element data in said processing.

18. A program according to claim 17, wherein, when said version management data holds IDs of said versions and said second application element data associated with said versions in a format of records, said program further comprises searching said identified version management data by using the ID of a specified version as a key for a particular one of said second application element data that is associated with said specified version.

19. A program according to claim 17, wherein, when said version management data includes a table associating the ID of each version with the ID of one of said second application element data that is associated with said version, said program further comprises:

searching said table of said version management data by using the ID of a specified version as a key for the ID of said second application element data that is associated with said specified version; and carrying out processing to obtain said second application element data by using said ID of said second application element data.

* * * * *